(12) United States Patent
Kanda et al.

(10) Patent No.: US 10,003,395 B2
(45) Date of Patent: Jun. 19, 2018

(54) TRANSMISSION TERMINAL, TRANSMISSION SYSTEM, RELAY DEVICE SELECTING METHOD, AND RECORDING MEDIUM

(71) Applicants: Hiroyuki Kanda, Kanagawa (JP); Takahiro Asai, Kanagawa (JP)

(72) Inventors: Hiroyuki Kanda, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 46 days.

(21) Appl. No.: 14/719,627

(22) Filed: May 22, 2015

(65) Prior Publication Data

US 2015/0349873 A1 Dec. 3, 2015

(30) Foreign Application Priority Data

May 28, 2014 (JP) .................................. 2014-109883

(51) Int. Cl.
  *H04B 7/155* (2006.01)
  *H04N 7/14* (2006.01)
  (Continued)

(52) U.S. Cl.
  CPC ......... *H04B 7/15507* (2013.01); *H04N 7/147* (2013.01); *H04N 7/15* (2013.01); *H04W 40/12* (2013.01)

(58) Field of Classification Search
  CPC .......... H04N 7/142; H04N 7/147; H04N 7/15; H04N 7/152; H04N 5/38; H04N 7/148;
  (Continued)

(56) References Cited

U.S. PATENT DOCUMENTS

2003/0204590 A1* 10/2003 Torii .................... H04L 12/26
  709/224
2007/0171274 A1 7/2007 Yim
  (Continued)

FOREIGN PATENT DOCUMENTS

EP  2 398 187 A1  12/2011
JP  2008-227577  9/2008
  (Continued)

OTHER PUBLICATIONS

Extended Search Report dated Oct. 29, 2015 in European Patent Application No. 15169296.9.

*Primary Examiner* — Marsha D. Banks Harold
*Assistant Examiner* — Natasha W Cosme
(74) *Attorney, Agent, or Firm* — Oblon, McClelland, Maier & Neustadt, L.L.P.

(57) ABSTRACT

A transmission terminal includes a memory that stores first preferential rating information indicating a preferential rating of the transmission terminal in using each of a plurality of relay devices, a transmitter that transmits a start request for starting communication with a counterpart transmission terminal, a receiver that receives second preferential rating information indicating a preferential rating of the counterpart transmission terminal in using each of the plurality of relay devices, the second preferential rating information being transmitted from the counterpart transmission terminal in response to the start request, and circuitry that selects one relay device to relay content data between the transmission terminal and the counterpart transmission terminal, from the plurality of relay devices, using the first preferential rating information and the second preferential rating information.

13 Claims, 17 Drawing Sheets

(51) Int. Cl.
*H04N 7/15* (2006.01)
*H04W 40/12* (2009.01)

(58) Field of Classification Search
CPC ....... H04N 21/234327; H04N 21/4788; H04N 21/64792
USPC ........................................................ 370/315
See application file for complete search history.

(56) References Cited

U.S. PATENT DOCUMENTS

| | | |
|---|---|---|
| 2012/0002003 A1 | 1/2012 | Okita et al. |
| 2013/0162756 A1* | 6/2013 | Ellison .................. H04L 65/403 |
| | | 348/14.08 |
| 2013/0298031 A1 | 11/2013 | Kanda et al. |
| 2014/0055555 A1 | 2/2014 | Imai |
| 2014/0240448 A1 | 8/2014 | Kanda et al. |
| 2014/0244755 A1 | 8/2014 | Kanda et al. |
| 2014/0244756 A1 | 8/2014 | Kanda et al. |

FOREIGN PATENT DOCUMENTS

| | | |
|---|---|---|
| JP | 2012-075072 | 4/2012 |
| JP | 2013-106071 | 5/2013 |

\* cited by examiner

LOW RESOLUTION

INTERMEDIATE RESOLUTION

HIGH RESOLUTION

FIG. 9A

PRIORITY LIST OF RELAY DEVICE

| PRIORITY | RELAY DEVICE ID | PREFERENTIAL RATING |
|---|---|---|
| 1 | 111a | 10 |
| 2 | 111b | 8 |
| 3 | 111c | 5 |
| 4 | 111d | 0 |

FIG. 9B

PRIORITY LIST OF RELAY DEVICE

| PRIORITY | RELAY DEVICE ID | PREFERENTIAL RATING |
|---|---|---|
| 1 | 111b | 10 |
| 2 | 111c | 8 |
| 3 | 111a | 5 |
| 4 | 111d | 0 |

FIG. 9C

PRIORITY LIST OF RELAY DEVICE

| PRIORITY | RELAY DEVICE ID | PREFERENTIAL RATING |
|---|---|---|
| 1 | 111d | 10 |
| 2 | 111c | 8 |
| 3 | 111b | 3 |
| 4 | 111a | 0 |

FIG. 10

CHANGE QUALITY MANAGEMENT TABLE

| IP ADDRESS OF RELAY DESTINATION TERMINAL | QUALITY OF IMAGE DATA TO BE RELAYED (QUALITY OF IMAGE) |
|---|---|
| 1.3.2.4 | HIGH QUALITY |
| 1.3.1.3 | LOW QUALITY |
| 1.3.2.3 | INTERMEDIATE QUALITY |
| ... | ... |

FIG. 11

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 12

TERMINAL MANAGEMENT TABLE

| TERMINAL ID | COUNTERPART TERMINAL NAME | OPERATING STATE | DATE/TIME RECEIVED | IP ADDRESS OF TERMINAL |
|---|---|---|---|---|
| 01aa | AA TERMINAL, TOKYO OFFICE, JAPAN | ONLINE (COMMUNICATION OK) | 2009.11.10.13:40 | 1.2.1.3 |
| 01ab | AB TERMINAL, TOKYO OFFICE, JAPAN | OFFLINE | 2009.11.09.12:00 | 1.2.1.4 |
| ... | ... | ... | ... | ... |
| 01ba | BA TERMINAL, OSAKA OFFICE, JAPAN | ONLINE (COMMUNICATION OK) | 2009.11.10.13:45 | 1.2.2.3 |
| 01bb | BB TERMINAL, OSAKA OFFICE, JAPAN | ONLINE (INTERRUPTED) | 2009.11.10.13:50 | 1.2.2.4 |
| ... | ... | ... | ... | ... |
| 01ca | CA TERMINAL, NEW YORK OFFICE, U.S. | OFFLINE | 2009.11.10.12:45 | 1.3.1.3 |
| 01cb | CB TERMINAL, NEW YORK OFFICE, U.S. | ONLINE (COMMUNICATING) | 2009.11.10.13:55 | 1.3.1.4 |
| ... | ... | ... | ... | ... |
| 01da | DA TERMINAL, WASHINGTON D.C. OFFICE, U.S. | ONLINE (COMMUNICATING) | 2009.11.08.12:45 | 1.3.2.3 |
| 01db | DB TERMINAL, WASHINGTON D.C. OFFICE, U.S. | ONLINE (COMMUNICATION OK) | 2009.11.10.12:45 | 1.3.2.4 |
| ... | ... | ... | ... | ... |

FIG. 13

CANDIDATE LIST MANAGEMENT TABLE

| TERMINAL ID OF REQUEST SENDER TERMINAL | TERMINAL ID OF COUNTERPART TERMINAL |
|---|---|
| 01aa | 01ab,⋯,01ba,01bb,⋯,01ca,01cb,01da,01db,⋯ |
| 01ab | 01aa,01ca,01cb |
| 01ba | 01aa,01ab,01ca,01cb,01da,01db |
| ⋯ | ⋯ |
| 01db | 01aa,01ab,01ba,⋯,01da,01ca,01cb,⋯,01da |

FIG. 14

SESSION MANAGEMENT TABLE

| SELECTION SESSION ID | RELAY DEVICE ID | TERMINAL ID OF REQUEST SENDER TERMINAL | TERMINAL ID OF COUNTERPART TERMINAL | DELAY TIME (ms) | DELAY INFORMATION DATE/TIME RECEIVED |
|---|---|---|---|---|---|
| se1 | 111c | 01aa | 01ba | 200 | 2009.11.10.14:00 |
| se1 | 111c | 01aa | 01db | 100 | 2009.11.10.14:02 |
| se2 | 111a | 01ba | 01ca | 50 | 2009.11.10.14:10 |
| ⋯ | ⋯ | ⋯ | ⋯ | ⋯ | ⋯ |

FIG. 15

QUALITY MANAGEMENT TABLE

| DELAY TIME (ms) | QUALITY OF IMAGE DATA (QUALITY OF IMAGE) |
|---|---|
| 0 - 100 | HIGH QUALITY |
| 100 - 300 | INTERMEDIATE QUALITY |
| 300 - 500 | LOW QUALITY |
| 500 - | (INTERRUPTED) |

TRANSMISSION TERMINAL, TRANSMISSION SYSTEM, RELAY DEVICE SELECTING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2014-109883, filed on May 28, 2014, in the Japan Patent Office, the entire disclosure of which is hereby incorporated by reference herein.

BACKGROUND

Technical Field

The present invention relates to selecting a relay device that relays content data, from among a plurality of relay devices.

Description of the Related Art

An example of a transmission system that performs transmission/reception of content data between a plurality of transmission terminals via a relay device includes a videoconference system that holds a videoconference via a communication network such as the Internet. There is an increasing need for such videoconference systems due to reduction in business trip costs and time in recent years. In such a videoconference system, a plurality of videoconference terminals, which are examples of transmission terminals, is used. A videoconference can be realized by transmission/reception of image data and sound data between these videoconference terminals.

In addition, the recent improvement of broadband circumstances contributes to transmission/reception of high-quality image data and high-quality sound data. Accordingly, it becomes easier to detect the circumstances of a communication partner in a videoconference, and hence conversation-based communication becomes more productive.

However, when many videoconferences are being held via a communication network or when image data and sound data are being received using a narrowband path on a communication network, reception of image data and sound data is delayed. It is said that a delay of 0.5 seconds or greater in reception of image data and sound data makes a user of a videoconference system feel stressed during conversation. Therefore, although the broadband environment has become more elaborate in recent years, there are circumstances where no videoconference satisfactory to users can be held.

In recent videoconference systems, a relay device that relays image data and sound data between videoconference terminals is provided for each local area network (LAN) in a communication network. With the use of such relay devices, communication processing in a videoconference is distributed, thereby reducing the load on each relay device, and the amount of data transmission, such as image data and sound data to be relayed, can be distributed.

In the case of selecting and using one relay device from among a plurality of relay devices, a relay device connected to a LAN to which a videoconference terminal holding a videoconference is connected as well is used. That is, by selecting a relay device with an Internet protocol (IP) address that is similar to the IP address of a videoconference terminal, high-quality image data and the like are transmitted/received via the selected relay device.

SUMMARY

While the above-described technique of selecting may contribute to reducing the load on each relay device on the network, the inventors of the present invention have realized that there may be cases where selection of the relay device based on the IP address does not always result in balancing the load on each relay device, or does not always contribute to well-balanced transmission or reception of high-quality content data in the actual communication network environment.

Example embodiments of the present invention include a transmission terminal, which includes a memory that stores first preferential rating information indicating a preferential rating of the transmission terminal in using each of a plurality of relay devices, a transmitter that transmits a start request for starting communication with a counterpart transmission terminal, a receiver that receives second preferential rating information indicating a preferential rating of the counterpart transmission terminal in using each of the plurality of relay devices, the second preferential rating information being transmitted from the counterpart transmission terminal in response to the start request, and circuitry that selects one relay device to relay content data between the transmission terminal and the counterpart transmission terminal, from the plurality of relay devices, using the first preferential rating information and the second preferential rating information.

Example embodiments of the present invention include a transmission system including the transmission terminal, a method of selecting a relay device, and a non-transitory recording medium storing a program for selecting a relay device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 9A to 9C are illustrations of relay device priority lists of transmission terminals;

FIG. 10 is an illustration of a change quality management table;

FIG. 11 is an illustration of an authentication management table;

FIG. 12 is an illustration of a terminal management table;

FIG. 13 is an illustration of a candidate list management table;

FIG. 14 is an illustration of a session management table;

FIG. 15 is an illustration of a quality management table;

DETAILED DESCRIPTION

Figure 1:
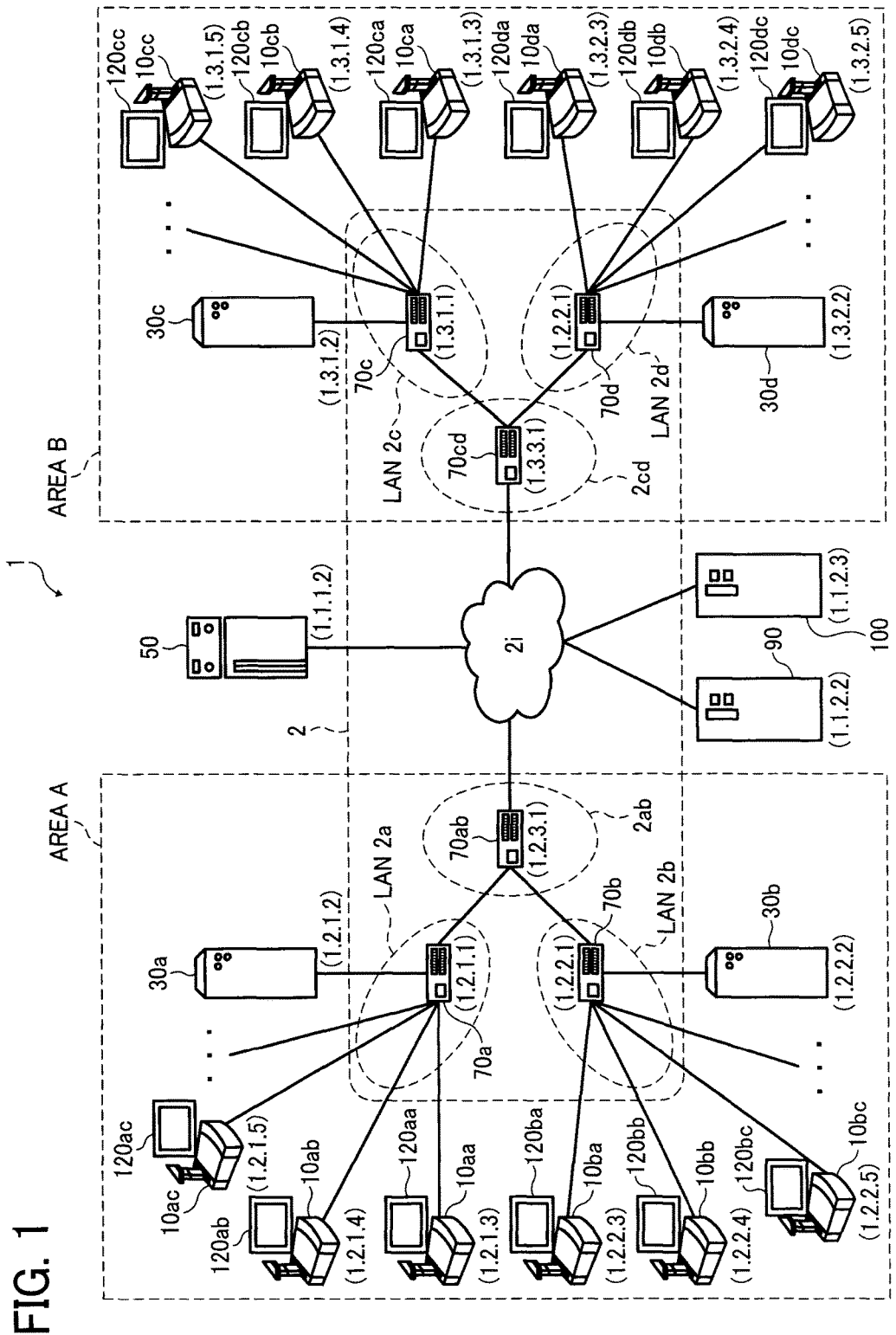
FIG. 1 is a schematic diagram of a transmission system according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an embodiment of the present invention will be described using FIGS. 1 to 20.

<Overall Configuration of Transmission System>

Figure 2:
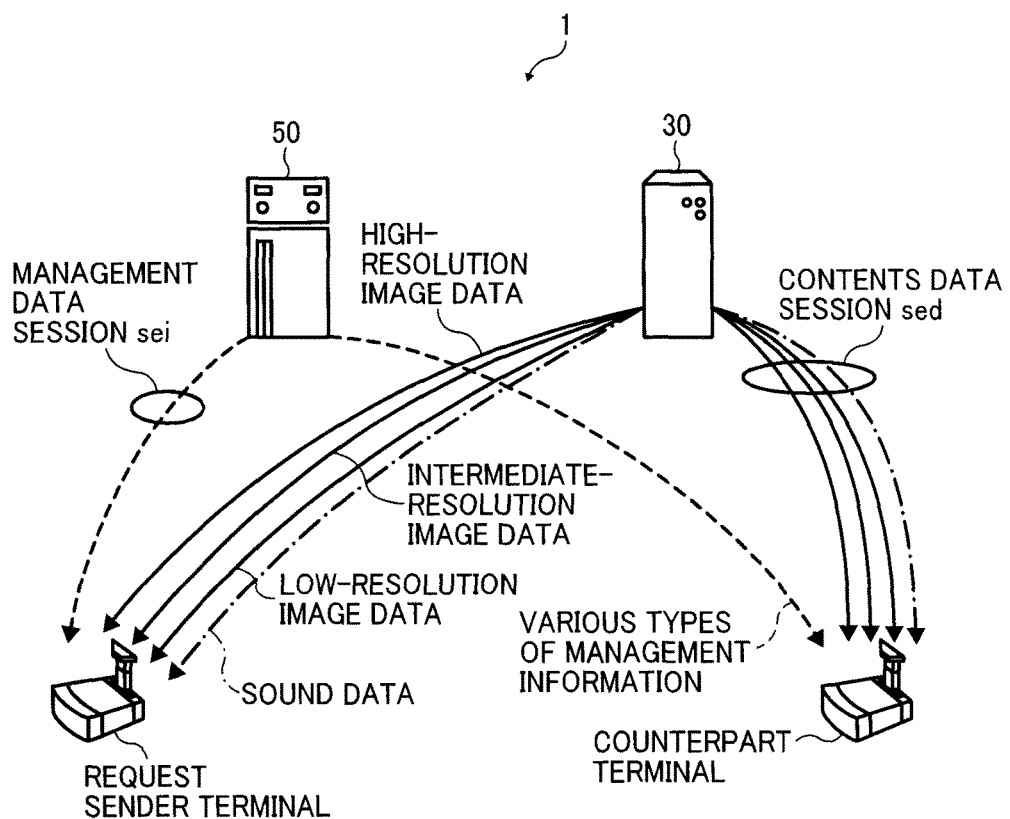
FIG. 2 is an illustration of a transmission/reception state of image data, sound data, and various types of management information in the transmission system of FIG. 1.
Figure 3A:
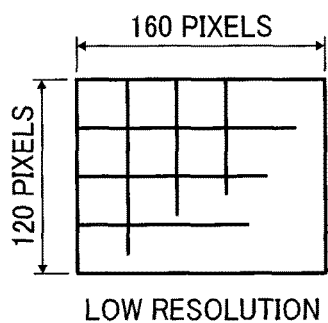
FIGS. 3A to 3C are illustrations describing the image quality of image data.
Figure 3B:
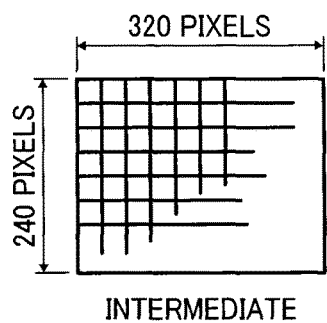
Figure 3C:
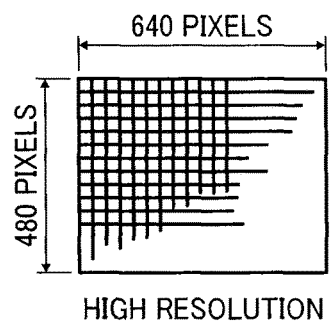

FIG. 1 is a schematic diagram of a transmission system according to the embodiment of the present invention. FIG. 2 is an illustration of a transmission/reception state of image data, sound data, and various types of management information in the transmission system. FIGS. 3A to 3C are illustrations describing the image quality of image data.

Note that the transmission system includes a data providing system that performs one-way transmission of content data from one transmission terminal to another transmission terminal via a transmission management system, and a communication system that intercommunicates information, information reflecting feelings, or the like between a plurality of transmission terminals via a transmission management system. The communication system is a system for intercommunicating information, information reflecting feelings, or the like between a plurality of communication terminals via a communication management system, and examples thereof include a videoconference system and a teleconference system.

In the embodiment, the transmission system, the transmission management system, and the transmission terminal will be described while assuming a videoconference system serving as an example of the communication system, a videoconference management system serving as the communication management system, and a videoconference terminal serving as an example of the communication terminal. That is, the transmission system, the transmission management system, and the transmission terminal of the present invention are not construed as being limited to the present embodiment.

First, a transmission system 1 illustrated in FIG. 1 includes a plurality transmission terminals (10aa, 10ab, . . . ), displays (120aa, 120ab, . . . ) for the individual transmission terminals (10aa, 10ab, . . . ), a plurality of relay devices (30a, 30b, 30c, and 30d), a transmission management system 50, a program providing system 90, and a maintenance system 100.

The plurality of terminals 10 perform transmission by transmitting and receiving image data and sound data serving as examples of content data.

In the following description, the term "transmission terminal" is simply represented as the term "terminal", and the term "transmission management system" is simply represented as the term "management system". In addition, an arbitrary one or ones of the plurality of terminals (10aa, 10ab, . . . ) is/are represented as a "terminal(s) 10". An arbitrary one or ones of the plurality of displays (120aa, 120ab, . . . ) is/are represented as a "display(s) 120". An arbitrary one or ones of the plurality of relay devices (30a, 30b, 30c, and 30d) is/are represented as a "relay device(s) 30". Further, a terminal serving as a request sender that sends a request to start a videoconference is represented as a "request sender terminal", and a terminal serving as a counterpart terminal that is a request destination (relay destination) is represented as a "counterpart terminal".

In addition, as illustrated in FIG. 2, a management information session sei for transmitting and receiving various types of management information is established via the management system 50 between a request sender terminal and a counterpart terminal in the transmission system 1. In addition, four sessions for transmitting and receiving four items of data, namely, high-resolution image data, intermediate-resolution image data, low-resolution image data, and sound data, are established via a relay device 30 between the request sender terminal and the counterpart terminal. Here, these four sessions are collectively indicated as an image/sound data session sed. Note that it is not necessary for the image/sound data session sed to include four sessions, and the image/sound data session sed may include less than or more than four sessions.

Here, the resolution of images of image data handled in the embodiment will be described. There are the following images: a low-resolution image, serving as a base image, having horizontal 160 pixels by vertical 120 pixels, as illustrated in FIG. 3A; an intermediate-resolution image having horizontal 320 pixels by vertical 240 pixels, as illustrated in FIG. 3B; and a high-resolution image having horizontal 640 pixels by vertical 480 pixels, as illustrated in FIG. 3C. In the case of being via a narrowband path, low-quality image data that only includes low-resolution image data serving as a base image is relayed. In the case of a relatively wide band, intermediate-quality image data including low-resolution image data serving as a base image and intermediate-resolution image data is relayed. In addition, in the case of a very wide band, high-quality image data including low-resolution image data serving as a base image, intermediate-resolution image data, and high-resolution image data is relayed.

The relay devices 30 illustrated in FIG. 1 relay content data between the plurality of terminals 10. The management system 50 collectively manages login authentication from the terminals 10, the communication states, candidate lists, and so forth of the terminals 10, and the communication states and so forth of the relay devices 30. Note that an image of image data may be a moving image or a still image, or may include both thereof.

A plurality of routers (70a, 70b, 70c, 70d, 70ab, and 70cd) select an optimal path for image data and sound data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a terminal program for causing a terminal 10 to realize various functions (or for causing a terminal 10 to function as various elements), and the terminal program can be transmitted to the terminal 10. The HD 204 of the program providing system 90 also stores a relay device program for causing a relay device 30 to realize various functions (or for causing a relay device 30 to function as various elements), and the relay device program can be transmitted to the relay device 30. The HD 204 of the program providing system 90 further stores a transmission management program for causing the management system 50 to realize various functions (or for causing the management system 50 to function as various elements), and the transmission management program can be transmitted to the management system 50.

The maintenance system 100 is one or more computers for performing maintenance, management, or conservation of at least one of the terminals 10, the relay devices 30, the management system 50, and the program providing system 90. For example, in the case where the maintenance system 100 is located in one country, and the terminals 10, the relay devices 30, the management system 50, or the program providing system 90 is/are located outside that country, the maintenance system 100 remotely performs, via a communication network 2, maintenance, management, or conservation of at least one of the terminals 10, the relay devices 30, the management system 50, and the program providing system 90. In addition, the maintenance system 100 performs maintenance such as management of the modal number, serial number, sales contact, maintenance checkup, or a past history of failures of at least one of the terminals 10, the relay devices 30, the management system 50, and the program providing system 90 without having the communication network 2 therebetween.

The terminals (10aa, 10ab, 10ac, . . . ), the relay device 30a, and the router 70a are connected to be communicable with each other by a LAN 2a. The terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab and are configured in a certain area A. For example, the area A is Japan, the LAN 2a is configured in an office in Tokyo, and the LAN 2b is configured in an office in Osaka.

In contrast, the terminals (10ca, 10cb, 10cc, . . . ), the relay device 30c, and the router 70c are connected to be communicable with each other by a LAN 2c. The terminals (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd and are configured in a certain area B. For example, the area B is the United States, the LAN 2c is configured in an office in New York, and the LAN 2d is configured in an office in Washington D.C. The area A and the area B are connected to be communicable with each other from the routers (70ab and 70cd), respectively, via the Internet 2i.

In addition, the management system 50 and the program providing system 90 are connected to be communicable with the terminals 10 and the relay devices 30 via the Internet 2i. The management system 50 and the program providing system 90 may be located in the area A or the area B, or may be located in other areas.

In the embodiment, the communication network 2 of the embodiment includes the LAN 2a, the LAN 2b, the dedicated line 2ab, the Internet 2i, the dedicated line 2cd, the LAN 2c, and the LAN 2d. The communication network 2 may include not only a wired portion, but also a portion where communication is performed wirelessly, such as Wireless Fidelity (WiFi) or Bluetooth (registered trademark). In addition in FIG. 1, four digits indicated below each of the terminals 10, each of the relay devices 30, the management system 50, each of the routers 70, and the program providing system 90 indicates an IP address in an abbreviated form in the general Internet Protocol version 4 (IPv4). For example, the IP address of the terminal 10aa is "1.2.1.3". Although IPv6 may be used instead of IPv4, IPv4 is used in order to make the description simple.

Note that the terminals 10 may be used not only for communication between different offices or for communication between different rooms in the same office, but also for communication within the same room or for outdoor-indoor communication or outdoor-outdoor communication. In the case where the terminals 10 are used outside, wireless communication using a mobile phone communication network or the like is performed.

<Hardware Configuration of Transmission System>

Figure 4:
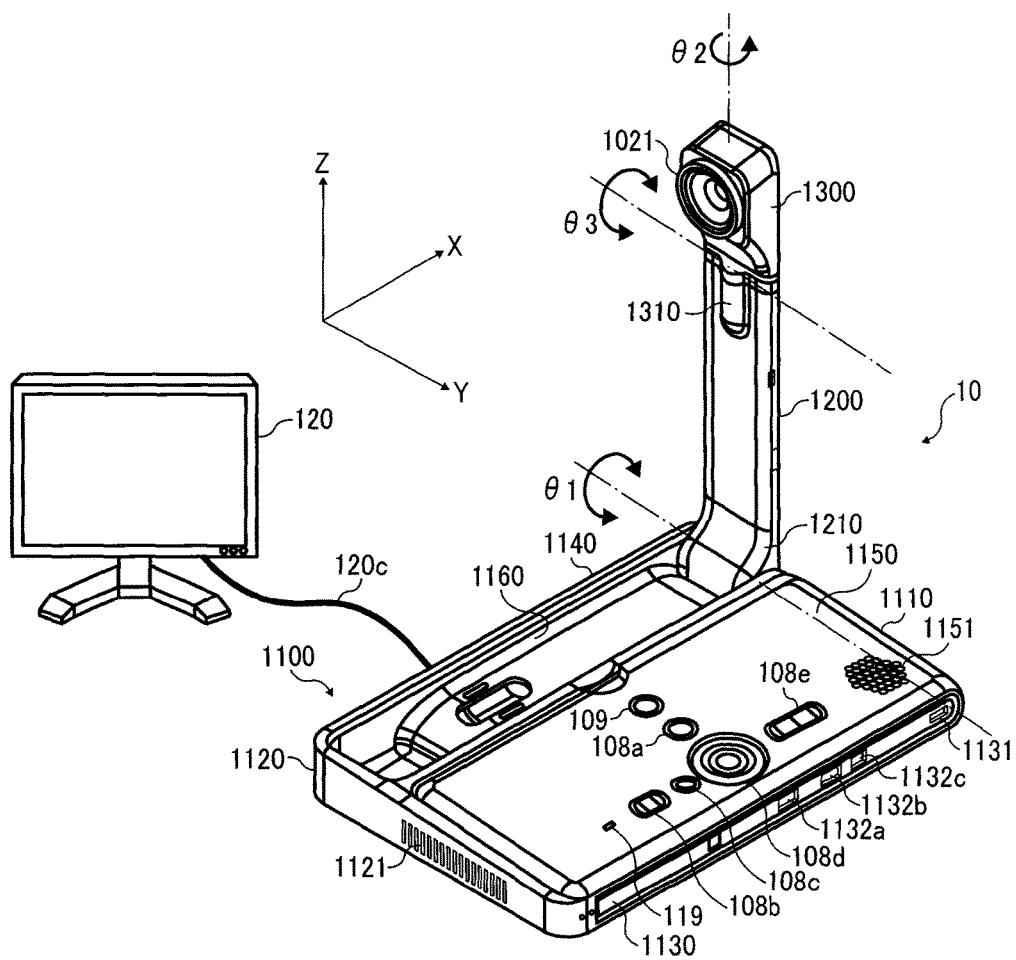
FIG. 4 is an external view of a terminal according to the embodiment.

Next, the hardware configuration of the transmission system 1 will be described. FIG. 4 is an external view of a terminal 10 according to the embodiment. As illustrated in FIG. 4, the terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes is formed. Accordingly, by driving of a cooling fan included in the casing 1100, air behind the communication terminal 10 can be taken in via the inlet face and exhausted to the rear of the communication terminal 10 via the exhaust face 1121. A right-side wall 1130 of the casing 1100 has a sound pickup hole 1131 formed thereon, and a built-in microphone 114, described later, is capable of picking up sound such as sound, noise, or vibration.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. In addition, the operation panel 1150 has a sound output face 1151 formed thereon, which is formed of a plurality of sound output holes for allowing output sound from a built-in speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later is provided on the right-side wall 1130 of the casing 1100. In contrast, a connection port for electrically connecting a cable 120c for a display 120 to the external device connection I/F 118 described later is provided on the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

Next, the arm 1200 is attached to the casing 1100 via a torque hinge 1210 and is configured to be rotatable in the vertical direction within the range of a tilt angle θ1 of 135 degrees with respect to the casing 1100. FIG. 4 indicates a state in which the tilt angle θ1 is 90 degrees. The camera housing 1300 has a built-in camera 112 provided thereon, which will be described later, and the camera 112 can capture an image of a user, a document, a room, or the like. The camera housing 1300 also has a torque hinge 1310 formed thereon. The camera housing 1300 is attached to the arm 1200 via the torque hinge 1310 and is configured to be rotatable in the vertical and horizontal directions within the range of a pan angle θ2 of ±180 degrees and a tilt angle θ3 of ±45 degrees with respect to the arm 1200, in which the state illustrated in FIG. 4 serves as 0 degrees.

Note that the external view illustrated in FIG. 4 is only exemplary and the appearance is not restricted thereto. The communication terminal 10 may be, for example, a general personal computer (PC), a smart phone, or a tablet terminal. The camera 112 and the microphone 114 need not necessarily be built-in devices and may be external devices. Since the transmission management system 50 has the same appearance as that of a general server computer, a description of the appearance thereof is omitted.

Figure 5:
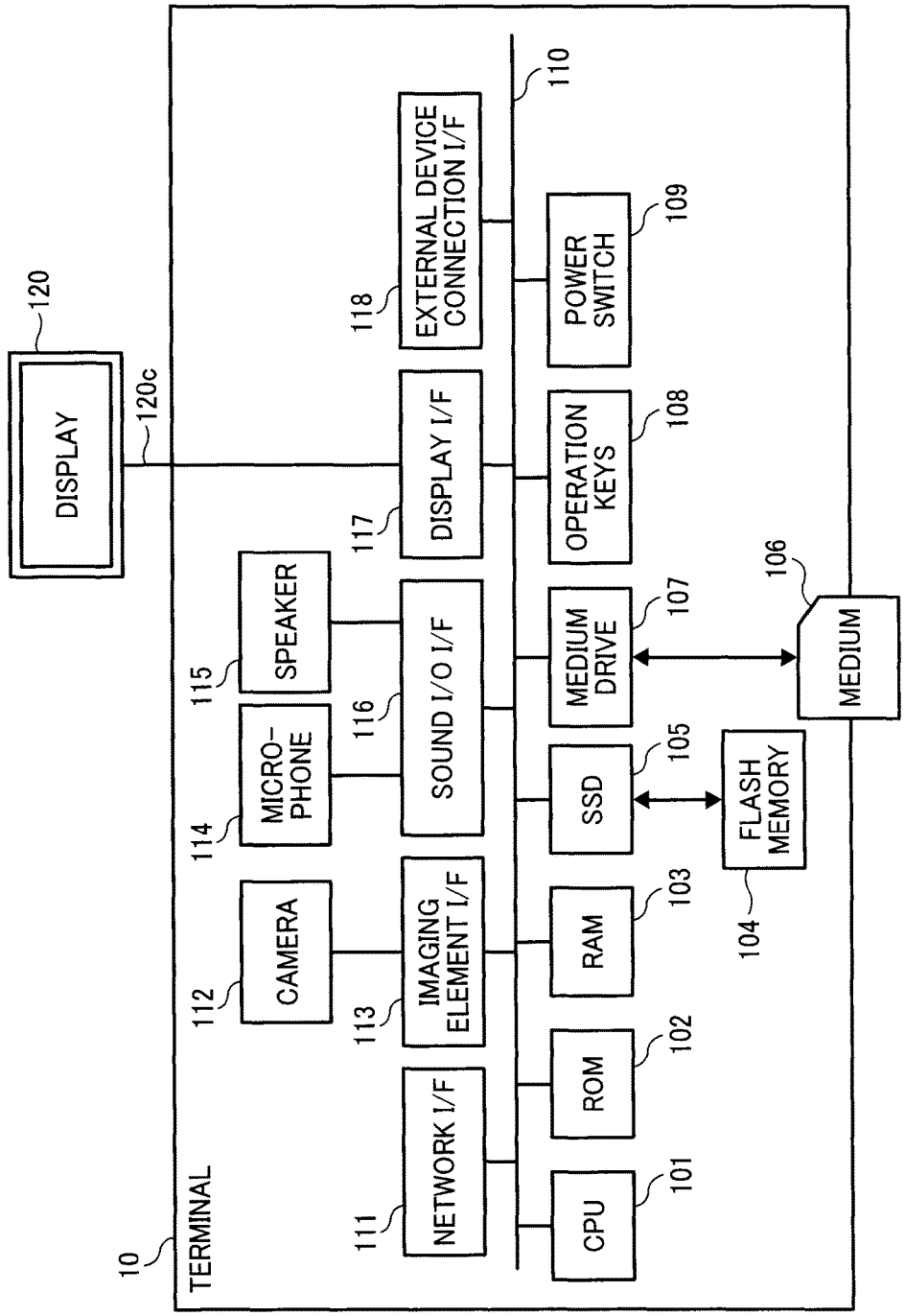
FIG. 5 is a hardware configuration diagram of the terminal according to the embodiment.

FIG. 5 is a hardware configuration diagram of a terminal 10 according to the embodiment of the present invention. As illustrated in FIG. 5, the terminal 10 of the embodiment includes a central processing unit (CPU) 101 that controls the overall operation of the terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as the terminal program, image data, and sound data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation keys 108 operated in the case of, for example, selecting a counterpart terminal of the terminal 10, the power switch 109 for turning ON/OFF the power of the terminal 10, and a network interface (I/F) 111 for transmitting data using the communication network 2.

In addition, the terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sound, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 5.

The display 120 may be a display of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the recording medium 106 is configured to be removable from the terminal 10. In addition, a non-volatile memory that reads or writes data under control of the CPU 101 is not limited to the flash memory 104, and an electrically erasable and programmable read-only memory (EEPROM) may be used instead.

Further, the terminal program may be recorded in a file in an installable format or an executable format on a computer-readable recording medium such as the recording medium 106 and distributed. In addition, the terminal program may be stored on the ROM 102, instead of the flash memory 104.

Figure 6:
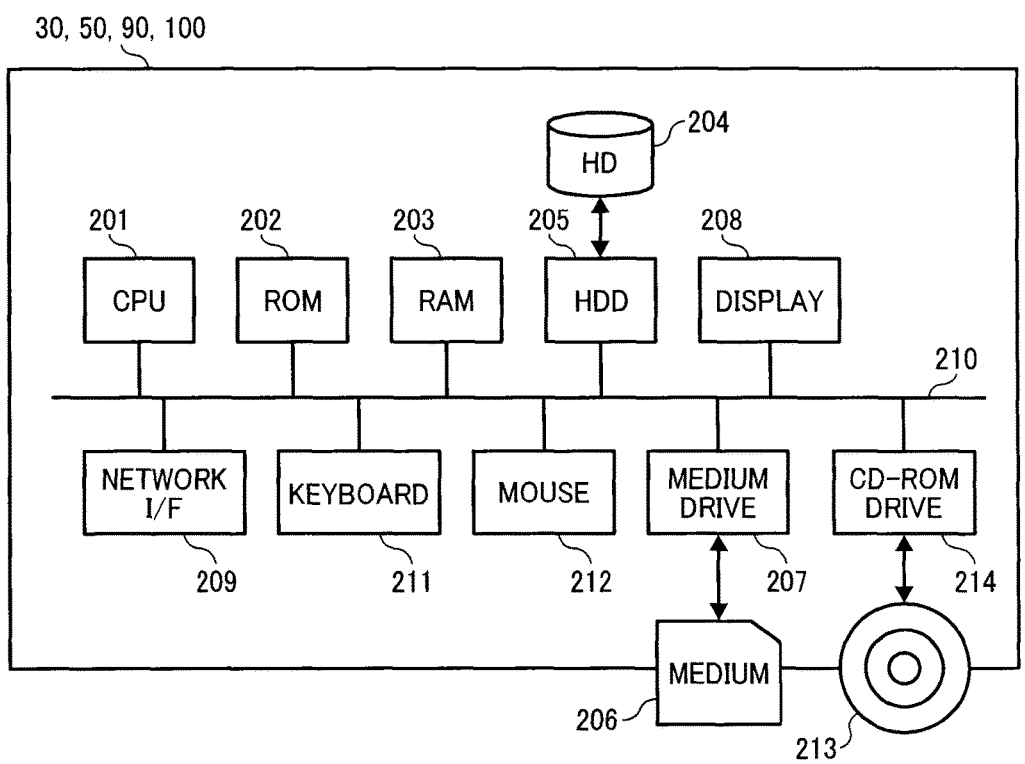
FIG. 6 is a hardware configuration diagram of a management system, a relay device, or a program providing system according to the embodiment.

FIG. 6 is a hardware configuration diagram of the management system 50 according to the embodiment of the present invention. The management system 50 includes a CPU 201 that controls the overall operation of the management system 50, a ROM 202 that stores a program used for driving the CPU 201, such as an IPL, a RAM 203 used as a work area for the CPU 201, the HD 204, which stores various types of data, such as the transmission management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements, as illustrated in FIG. 6.

Note that the transmission management program may be recorded in a file in an installable format or an executable format on a computer-readable recording medium such as the recording medium 206 or the CD-ROM 213 and distributed. In addition, the transmission management program may be stored on the ROM 202, instead of the HD 204.

In addition, since the relay devices 30 have a hardware configuration that is the same as or similar to that of the above-described management system 50, a description thereof is omitted. Note that the HD 204 stores a relay device program for controlling the relay devices 30. Also in this case, the relay device program may be recorded in a file in an installable format or an executable format on a computer-readable recording medium such as the recording medium 206 or the CD-ROM 213 and distributed. In addition, the relay device program may be stored on the ROM 202, instead of the HD 204.

In addition, since the program providing system 90 and the maintenance system 100 each have a hardware configuration that is the same as or similar to that of the above-described management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 and distributed. In addition, the program providing program may be stored on the ROM 202, instead of the HD 204.

Note that each of the above-described programs may be recorded on a computer-readable recording medium such as a compact disc recordable (CD-R), a digital versatile disk (DVD), or a Blu-ray disk, which serve as other examples of the above-described removable recording medium, and may be provided.

<Functional Configuration of Transmission System>

Figure 7:
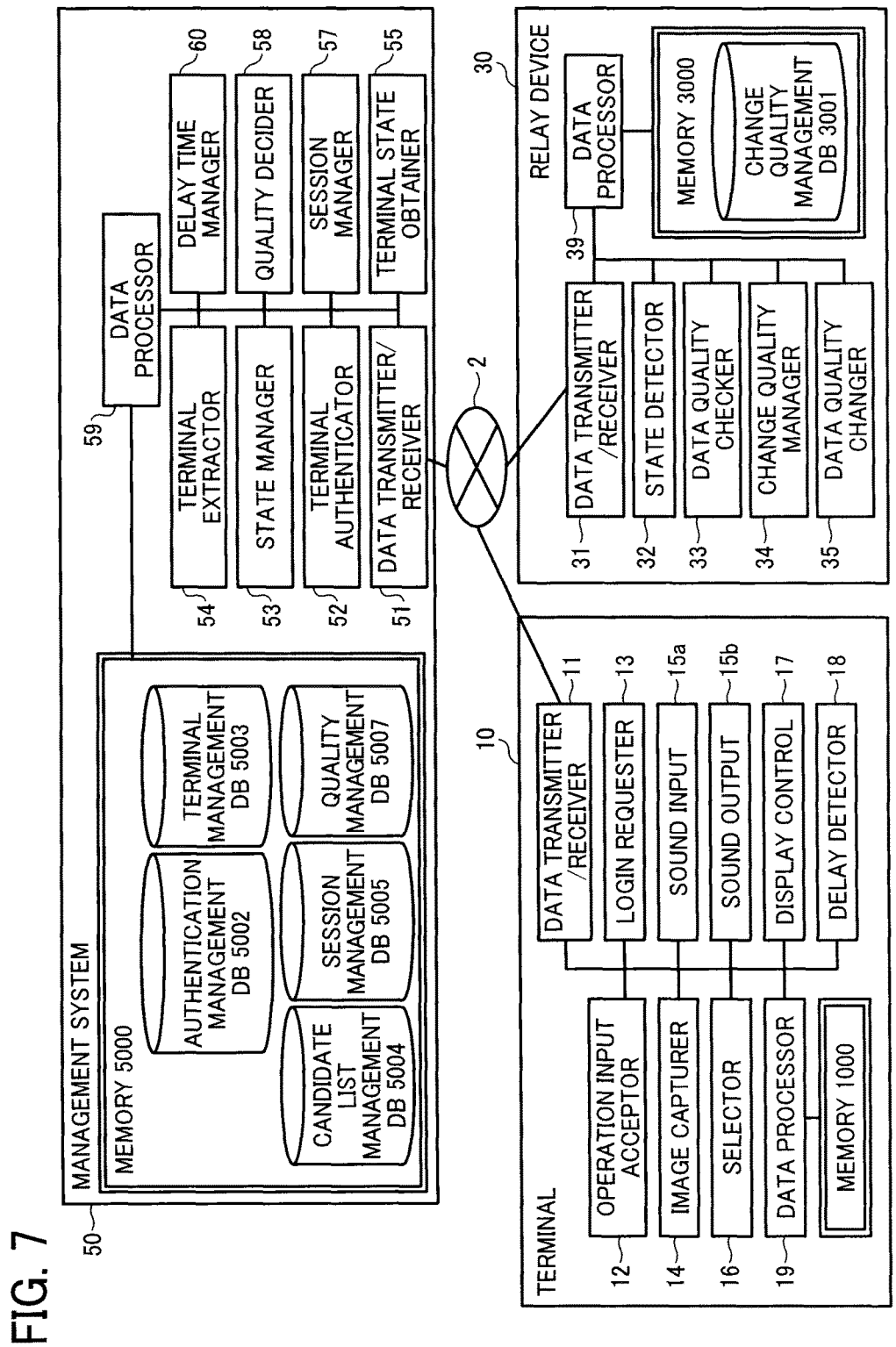
FIG. 7 is a functional block diagram of each terminal, device, and system included in the transmission system according to the embodiment.
Figure 8:
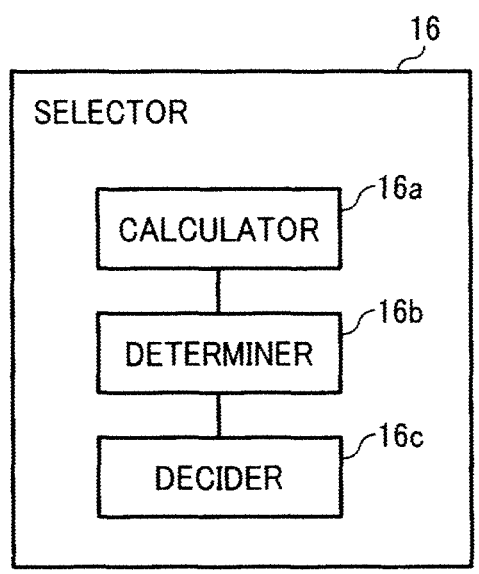
FIG. 8 is a functional diagram of a selector.

Next, the functional configuration of the embodiment will be described. FIG. 7 is a functional block diagram of each terminal, device, and system included in the transmission system 1 of the embodiment. In FIG. 7, the terminal 10, the relay device 30, and the management system 50 are connected to be capable of communicating data via the communication network 2. In addition, since the program providing system 90 illustrated in FIG. 1 is not directly related to videoconference communication, the program providing system 90 is omitted in FIG. 7.

<Functional Configuration of Terminal>

The terminal 10 includes a data transmitter/receiver 11, an operation input acceptor 12, a login requester 13, an image capturer 14, a sound input 15a, a sound output 15b, a selector 16, a display control 17, a delay detector 18, and a data processor 19. These units are functions that are realized by or units that function by operating any of the elements illustrated in FIG. 5 in response to a command from the CPU 101 in accordance with a terminal program expanded from the flash memory 104 to the RAM 103. The terminal 10 also includes a memory 1000 configured by the RAM 103 illustrated in FIG. 5, and the flash memory 104 illustrated in FIG. 5.

Next, using FIGS. 5 and 7, the functional configuration of the terminal 10 will be described in detail. Note that, in the following description of the functional configuration of the terminal 10, among elements illustrated in FIG. 5, relationships with main elements for realizing the functional configuration of the terminal 10 will also be described.

The data transmitter/receiver 11 of the terminal 10 illustrated in FIG. 7 is realized by a command from the CPU 101 illustrated in FIG. 5 and by the network I/F 111 illustrated in FIG. 5, and performs transmission/reception of various types of data (information) to/from another terminal, device, or system via the communication network 2. Before starting communication with a desired counterpart terminal, the data transmitter/receiver 11 starts receiving, from the management system 50, state information indicating the state of each terminal serving as a candidate counterpart terminal. The state information not only indicates the operating state of each terminal 10 (the terminal 10 is whether online or offline), but also indicates a detailed state such as whether the terminal 10 whose state is online is now capable of communicating or is currently communicating, or the user of the terminal 10 is not at the terminal 10. In addition, the state information not only indicates the operating state of each terminal 10, but also indicates various states, such as the state that the cable 120c is disconnected from the terminal 10, the state that the terminal 10 can output sound but not images, or the state that the terminal 10 is muted.

Hereinafter, the case in which the state information indicates the operating state will be described by way of example.

The operation input acceptor 12 is realized by a command from the CPU 101 illustrated in FIG. 5 and by the operation keys 108 and the power switch 109 illustrated in FIG. 5, and accepts various inputs from the user. For example, when the user turns on the power switch 109 illustrated in FIG. 5, the operation input acceptor 12 illustrated in FIG. 7 accepts the power on operation and turns on the power.

The login requester 13 is realized by a command from the CPU 101 illustrated in FIG. 5, and, upon acceptance of the above-described power on operation, automatically transmits, from the data transmitter/receiver 11 to the management system 50 via the communication network 2, login request information indicating a login request, and the current IP address of the request sender terminal. In addition, when the user turns the power switch 109 from on to off, the data transmitter/receiver 11 transmits to the management system 50 state information indicating that the power is to be turned off, and then the operation input acceptor 12 completely turns off the power. Accordingly, the management system 50 side can detect that the power of the terminal 10 is turned from on to off.

The image capturer 14 is realized by a command from the CPU 101 illustrated in FIG. 5 and by the camera 112 and the imaging element I/F 113 illustrated in FIG. 5. The image capturer 14 captures an image of a subject and outputs image data obtained by capturing the image.

The sound input 15a is realized by a command from the CPU 101 illustrated in FIG. 5 and by the sound input/output I/F 116 illustrated in FIG. 5. After the sound of the user is converted to a sound signal by the microphone 114, the sound input 15a receives sound data according to this sound signal. The sound output 15b is realized by a command from the CPU 101 illustrated in FIG. 5 and by the sound input/output I/F 116 illustrated in FIG. 5, and outputs the sound signal according to the sound data to the speaker 115, and the speaker 115 outputs sound.

The selector 16 selects a particular relay device 30 that relays content data, on the basis of a priority list of the local transmission terminal 10 (an example of first preferential rating information), and a priority list of another transmission terminal 10 (an example of second preferential rating information). Therefore, the selector 16 realizes a calculator 16a, a determiner 16b, and a decider 16c illustrated in FIG. 8, in response to a command from the CPU 101 illustrated in FIG. 5.

FIGS. 9A to 9C are illustrations of relay device priority lists of transmission terminals 10. As illustrated in FIGS. 9A, 9B, and 9C, a priority list associatively stores a relay device ID and its preferential rating according to the order of priority. The value of the preferential rating is set by the user of each terminal 10 or the administrator of the transmission management system 50. Here, FIG. 9A illustrates a priority list of the terminal 10aa, which is stored in the memory 1000 of the terminal 10aa. FIG. 9B illustrates a priority list of the terminal 10ba, which is stored in the memory 1000 of the terminal 10ba. FIG. 9C illustrates a priority list of the terminal 10db, which is stored in the memory 1000 of the terminal 10db. For example, the preferential rating of the relay device 30a indicated by the relay device ID "111a" is the highest in FIG. 9A but is the lowest in FIG. 9C. In contrast, the preferential rating of the relay device 30c indicated by the relay device ID "111c" is the second highest in FIG. 9B and also is the second highest in FIG. 9C, which is well-balanced.

The preferential rating may be set based on one or more factors. In one example, the preferential rating may be set based on a factor indicating cost, such as an operational cost of the relay device. More specifically, the relay device with higher operational cost is assigned with a lower value, and the relay device with lower operational cost is assigned with a higher value.

In another example, the preferential rating may be set based on a factor indicating reliability, such as MTBF (mean time between failures) of the relay device. More specifically, the relay device with higher MTBF is assigned with a higher value, and the relay device with lower MTBF is assigned with a lower value.

In another example, the preferential rating may be set based on a factor indicating capacity of the relay device, such as specification of a CPU in the relay device. More specifically, the relay device with higher CPU specification is assigned with a higher value, and the relay device with lower CPU specification is assigned with a lower value.

Next, for each relay device ID, the calculator 16a derives the total preferential rating by adding a preferential rating in a priority list of a local terminal and a preferential rating in a priority list of another transmission terminal.

The determiner 16b determines whether there is only one total preferential rating having the highest value among the total preferential ratings.

The decider 16c decides on, among a plurality of relay device IDs, a relay device ID according to the total preferential rating having the highest value among the total preferential ratings. In the case where there is a plurality of total preferential ratings having the highest value, the decider 16c decides on a relay device ID according to a total preferential rating randomly selected from among the plurality of total preferential ratings having the highest value.

The display control 17 is realized by a command from the CPU 101 illustrated in FIG. 5 and by the display I/F 117 illustrated in FIG. 5, and performs control for combining items of received image data having different resolutions and transmitting the combined image data to the display 120, as will be described later. The display control 17 can also transmit information on a candidate list, received from the management system 50, to the display 120, and display the candidate list on the display 120.

The delay detector 18 is realized by a command from the CPU 101 illustrated in FIG. 5, and detects a delay time (ms) of image data or sound data transmitted from another terminal 10 via a relay device 30.

The data processor 19 is realized by a command from the CPU 101 illustrated in FIG. 5 and by the SSD 105 illustrated in FIG. 5, or by a command from the CPU 101, and performs processing to store various types of data in the memory 1000 or to read various types of data stored in the memory 1000. The memory 1000 stores a terminal identification (ID) serving as an example of identification information for identifying the terminal 10, a password, and the like.

Further, every time image data and sound data are received in performing communication with a counterpart terminal, the memory 1000 overwrites the image data and sound data. On the basis of image data before being overwritten, an image is displayed on the display 120, and, on the basis of sound data before being overwritten, sound is output from the speaker 115. The memory 1000 also stores a priority list of a local terminal.

Note that a terminal ID and a later-described relay device ID in the embodiment indicate identification information such as a language, a character(s), a symbol(s), or various marks used to uniquely identify a corresponding terminal 10 and a corresponding relay device 30. In addition, a terminal ID and a relay device ID may be identification information including a combination of at least two of the above-mentioned language, character(s), symbol(s), and various marks.

Instead of a terminal ID, a user ID for identifying the user of a terminal 10 may be used. In this case, terminal identification information includes not only the terminal ID, but also the user ID.

<Functional Configuration of Relay Device>

Each relay device 30 includes a data transmitter/receiver 31, a state detector 32, a data quality checker 33, a change quality manager 34, a data quality changer 35, and a data processor 39. These units are functions that are realized by operating any of the elements illustrated in FIG. 6 in response to a command from the CPU 201 in accordance with a relay device program expanded from the HD 204 to the RAM 203. The relay device 30 also includes a memory 3000 configured by the RAM 203 illustrated in FIG. 6 and/or the HD 204 illustrated in FIG. 6.

(Change Quality Management Table)

The memory 3000 stores a change quality management database (DB) 3001 configured by a change quality management table such as that illustrated in FIG. 10. In the change quality management table, the IP address of a terminal 10 serving as a relay destination (counterpart terminal) of image data, and the image quality of image data relayed by a relay device 30 to this relay destination are stored in association with each other.

(Functional Configuration of Relay Device)

Next, the functional configuration of each relay device 30 will be described in detail. Note that, in the following description of the functional configuration of the relay device 30, among elements illustrated in FIG. 6, relationships with main elements for realizing the functional configuration of the relay device 30 will also be described.

The data transmitter/receiver 31 of the relay device 30 illustrated in FIG. 7 is realized by a command from the CPU 201 illustrated in FIG. 6 and by the network I/F 209 illustrated in FIG. 6, and performs transmission/reception of various types of data (information) to/from another terminal, device, or system via the communication network 2.

The state detector 32 is realized by a command from the CPU 201 illustrated in FIG. 6, and detects the operating state of the relay device 30 including this state detector 32. The possible operating states are "online", "offline", "communicating", and "interrupted".

The data quality checker 33 is realized by a command from the CPU 201 illustrated in FIG. 6, searches the change quality management DB 3001 (see FIG. 10) by using the IP address of a counterpart terminal as a search key, and extracts a corresponding image quality of image data to be relayed, thereby checking the image quality of image data to be relayed.

The change quality manager 34 is realized by a command from the CPU 201 illustrated in FIG. 6, and changes the contents of the change quality management DB 3001 on the basis of later-described quality information, transmitted from the management system 50. For example, during a videoconference realized by transmitting/receiving high-quality image data between a request sender terminal (terminal 10*aa*) whose terminal ID is "01aa" and a counterpart terminal (terminal 10*db*) whose terminal ID is "01db", when reception of image data by the counterpart terminal (terminal 10*db*) is delayed in response to, for example, starting a videoconference between a request sender terminal (terminal 10*bb*), which performs another videoconference, and a counterpart terminal (terminal 10*ca*) via the communication network 2, the relay device 30 lowers the image quality of image data being relayed up to now from high quality to intermediate quality. In such a case, on the basis of quality information indicating intermediate quality, the contents of the change quality management DB 3001 are changed in order to lower the image quality of image data relayed by the relay device 30 from high quality to intermediate quality.

The data quality changer 35 is realized by a command from the CPU 201 illustrated in FIG. 6, and changes the image quality of image data transmitted from a terminal 10 serving as a transmission source, on the basis of the above-changed contents of the change quality management DB 3001.

The data processor 39 is executed by a command from the CPU 201 illustrated in FIG. 6 and the HDD 205 illustrated in FIG. 6, and performs processing to store various types of data in the memory 3000 or read various types of data stored in the memory 3000.

<Functional Configuration of Management System>

The management system 50 includes a data transmitter/receiver 51, a terminal authenticator 52, a state manager 53, a terminal extractor 54, a terminal state obtainer 55, a session manager 57, a quality decider 58, a data processor 59, and a delay time manager 60. These units are functions that are realized by or units that are caused to function by operating any of the elements illustrated in FIG. 6 in response to a command from the CPU 201 in accordance with a management system program expanded from the HD 204 to the RAM 203. In addition, the management system 50 includes a memory 5000 configured by the HD 204 illustrated in FIG. 6.

(Authentication Management Table)

The memory 5000 stores an authentication management DB 5002 configured by an authentication management table such as that illustrated in FIG. 11. In the authentication management table, a password is managed in association with each of terminal IDs of all terminals 10 managed by the management system 50. For example, the authentication management table illustrated in FIG. 11 indicates that the terminal ID of the terminal 10*aa* is "01aa", and the password of the terminal 10*aa* is "aaaa".

(Terminal Management Table)

The memory 5000 also stores a terminal management DB 5003 configured by a terminal management table such as that illustrated in FIG. 12. In the terminal management table, for the terminal ID of each terminal 10, a counterpart terminal name in the case where the terminal 10 serves as a counterpart terminal, the operating state of the terminal 10, a date/time received at which login request information described later is received by the transmission management system 50, and the IP address of the terminal 10 are stored in association with one another. For example, the terminal management table illustrated in FIG. 12 indicates that the terminal 10*aa* with the terminal ID "01aa" has the counterpart terminal name "AA terminal, Tokyo office, Japan", the operating state "online (communication OK)", the date/time received at which login request information is received by the management system 50 "Nov. 10, 2009, 13:40", and the IP address "1.2.1.3".

(Candidate List Management Table)

The memory 5000 further stores a candidate list management DB 5004 configured by a candidate list management table such as that illustrated in FIG. 13. In the candidate list management table, the terminal IDs of all counterpart terminals 10 registered as candidate counterpart terminals are stored in association with the terminal ID of a request sender terminal that sends a request to start communication in a videoconference. For example, the candidate list management table illustrated in FIG. 13 indicates that candidates for a counterpart terminal to which a request sender terminal (terminal 10*aa*) whose terminal ID is "01aa" can send a request to start communication in a videoconference are the terminal 10*ab* whose terminal ID is "01ab", the terminal 10*ba* whose terminal ID is "01ba", the terminal 10*bb* whose terminal ID is "01bb", and so forth. The candidate counterpart terminals are updated by addition or deletion in response to an addition or deletion request received from an arbitrary request sender terminal to the management system 50.

(Session Management Table)

The memory 5000 also stores a session management DB 5005 configured by a session management table such as that illustrated in FIG. 14. In the session management table, for each selection session ID used in execution of a session for selecting a relay device 30, the relay device ID of a relay device 30 used in relaying image data and sound data, the terminal ID of a request sender terminal, the terminal ID of a counterpart terminal, a reception delay time (ms) in the case where the counterpart terminal receives image data, and a date/time received at which delay information indicating this delay time is transmitted from the counterpart terminal and received by the management system 50 are stored in association with one another. For example, the session management table illustrated in FIG. 14 indicates that the relay device 30c (relay device ID "111c") selected in a session executed using the selection session ID "se1" is relaying image data and sound data between a request sender terminal (terminal 10aa) whose terminal ID is "01aa" and a counterpart terminal (terminal 10ba) whose terminal ID is "01ba", and a delay time of image data at "Nov. 10, 2009, 14:00" at the counterpart terminal (terminal 10ba) is 200 (ms). In the case of performing a videoconference between two terminals 10, the delay information date/time received may be managed on the basis of delay information transmitted not from the counterpart terminal, as described above, but from the request sender terminal. However, in the case of performing a videoconference among three or more terminals 10, the delay information date/time received is managed on the basis of delay information transmitted from a terminal 10 that receives image data and sound data.

(Quality Management Table)

The memory 5000 further stores a quality management DB 5007 configured by a quality management table such as that illustrated in FIG. 15. In the quality management table, the delay time and the image quality (quality of an image) of image data are stored in association with each other such that the longer the delay time (ms) of image data at a request sender terminal or a counterpart terminal, the lower the image quality of image data relayed by the relay device 30.

(Functional Configuration of Management System)

Next, the functional configuration of the management system 50 will be described in detail. Note that, in the following description of the functional configuration of the management system 50, among elements illustrated in FIG. 6, relationships with main elements for realizing the functional configuration of the management system 50 will also be described.

The data transmitter/receiver 51 is executed by a command from the CPU 201 illustrated in FIG. 6 and by the network I/F 209 illustrated in FIG. 6, and performs transmission/reception of various types of data (information) to/from another terminal, device, or system via the communication network 2.

The terminal authenticator 52 is realized by a command from the CPU 201 illustrated in FIG. 6, and performs terminal authentication by searching the authentication management DB 5002 of the memory 5000 by using a terminal ID and a password included in login request information received via the data transmitter/receiver 51 as search keys and determining whether the same pair of a terminal ID and a password is managed in the authentication management DB 5002.

The state manager 53 is realized by a command from the CPU 201 illustrated in FIG. 6. In order to manage the operating state of a request sender terminal that has sent a login request, the terminal manager 53 stores the terminal ID of the request sender terminal, the operating state of the request sender terminal, the date/time received at which login request information is received by the management system 50, and the IP address of the request sender terminal in association with one another in the terminal management DB 5003 (see FIG. 12). In addition, on the basis of operating state information sent from the terminal 10 indicating that power is to be turned off when the user turns the power switch 109 of the terminal 10 from on to off, the state manager 53 changes the operating state indicating an online state to an offline state in the terminal management DB 5003 (see FIG. 12).

The terminal extractor 54 is realized by a command from the CPU 201 illustrated in FIG. 6, searches the candidate list management DB 5004 (see FIG. 13) by using the terminal ID of a request sender terminal that has sent a login request as a key, and reads the terminal ID of a candidate counterpart terminal that can communicate with the request sender terminal, thereby extracting the terminal ID. The terminal extractor 54 also searches the candidate list management DB 5004 (see FIG. 13) by using the terminal ID of a request sender terminal that has sent a login request as a key, and extracts the terminal ID of another request sender terminal that has the terminal ID of the former-mentioned request sender terminal registered as a candidate for a counterpart terminal.

The terminal state obtainer 55 is realized by a command from the CPU 201 illustrated in FIG. 6, searches the terminal management DB 5003 (see FIG. 12) by using the terminal ID of a candidate counterpart terminal, extracted by the terminal extractor 54, as a search key, and reads the operating state for each terminal ID extracted by the terminal extractor 54. Accordingly, the terminal state obtainer 55 can obtain the operating state of a candidate counterpart terminal that can communicate with a request sender terminal that has sent a login request. The terminal state obtainer 55 also searches the terminal management DB 5003 by using the terminal ID extracted by the terminal extractor 54 as a search key, and obtains the operating state of a request sender terminal that has sent a login request.

The session manager 57 is realized by a command from the CPU 201 illustrated in FIG. 6. The session manager 57 generates a selection session ID, and stores the selection session ID, the terminal ID of a request sender terminal, and the terminal ID of a counterpart terminal in the session management DB 5005 (see FIG. 14) of the memory 5000. The session manager 57 further stores, for each selection session ID in the session management DB 5005 (see FIG. 14), the relay device ID of a relay device 30 consequently selected as one relay device by the decider 16c of the terminal 10.

The quality decider 58 decides on the image quality of image data to be relayed by the relay device 30, by searching the quality management DB 5007 (see FIG. 15) using the above-mentioned delay time as a search key, and extracting a corresponding image quality of image data.

The data processor 59 is executed by a command from the CPU 201 illustrated in FIG. 6 and the HDD 205 illustrated in FIG. 6, and performs processing to store various types of data in the memory 5000 or read various types of data stored in the memory 5000.

The delay time manager 60 is realized by a command from the CPU 201 illustrated in FIG. 6, searches the terminal management DB 5003 (see FIG. 12) by using the IP address of the above-mentioned counterpart terminal as a search key, thereby extracting a corresponding terminal ID, and further stores and manages a delay time indicated by the above-mentioned delay information in a delay time field of a record including the above-extracted terminal ID in the session management table in the session management DB 5005 (see FIG. 14).

<Process or Operation>

Figure 16:
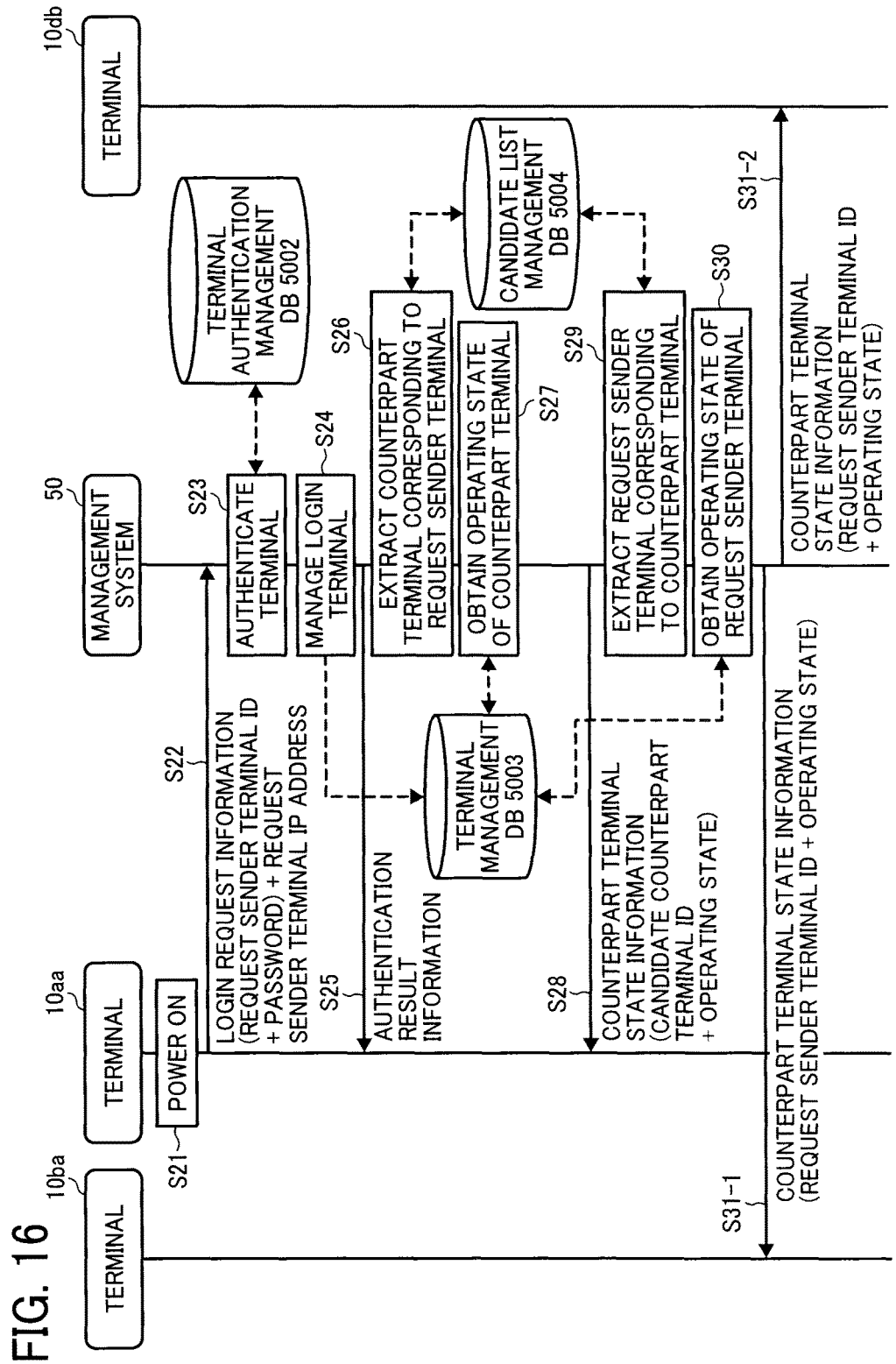
FIG. 16 is a sequence diagram illustrating an operation at a preparation step for starting remote communication between transmission terminals.
Figure 17:
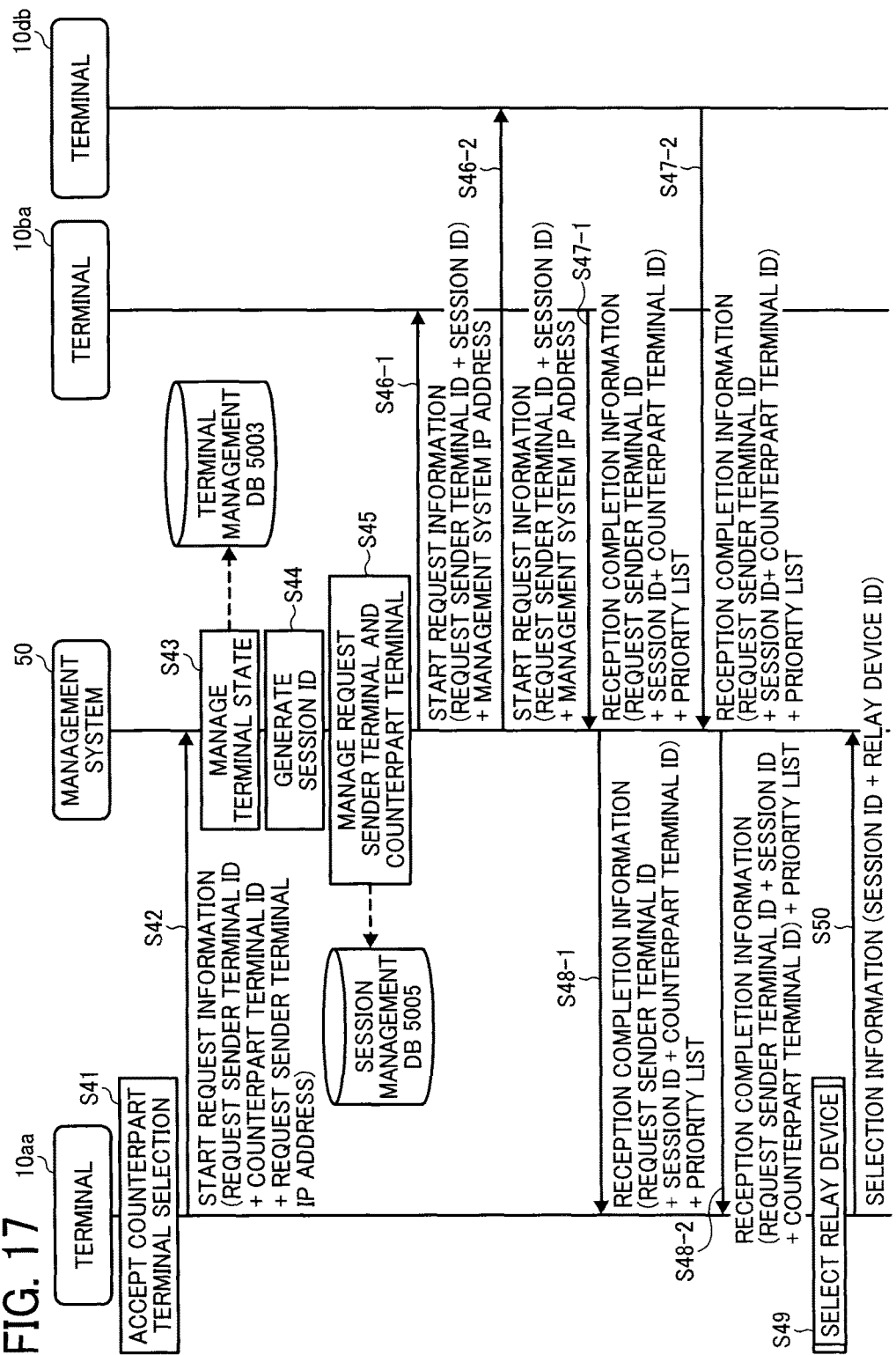
FIG. 17 is a sequence diagram illustrating operation of selecting a relay device.
Figure 18:
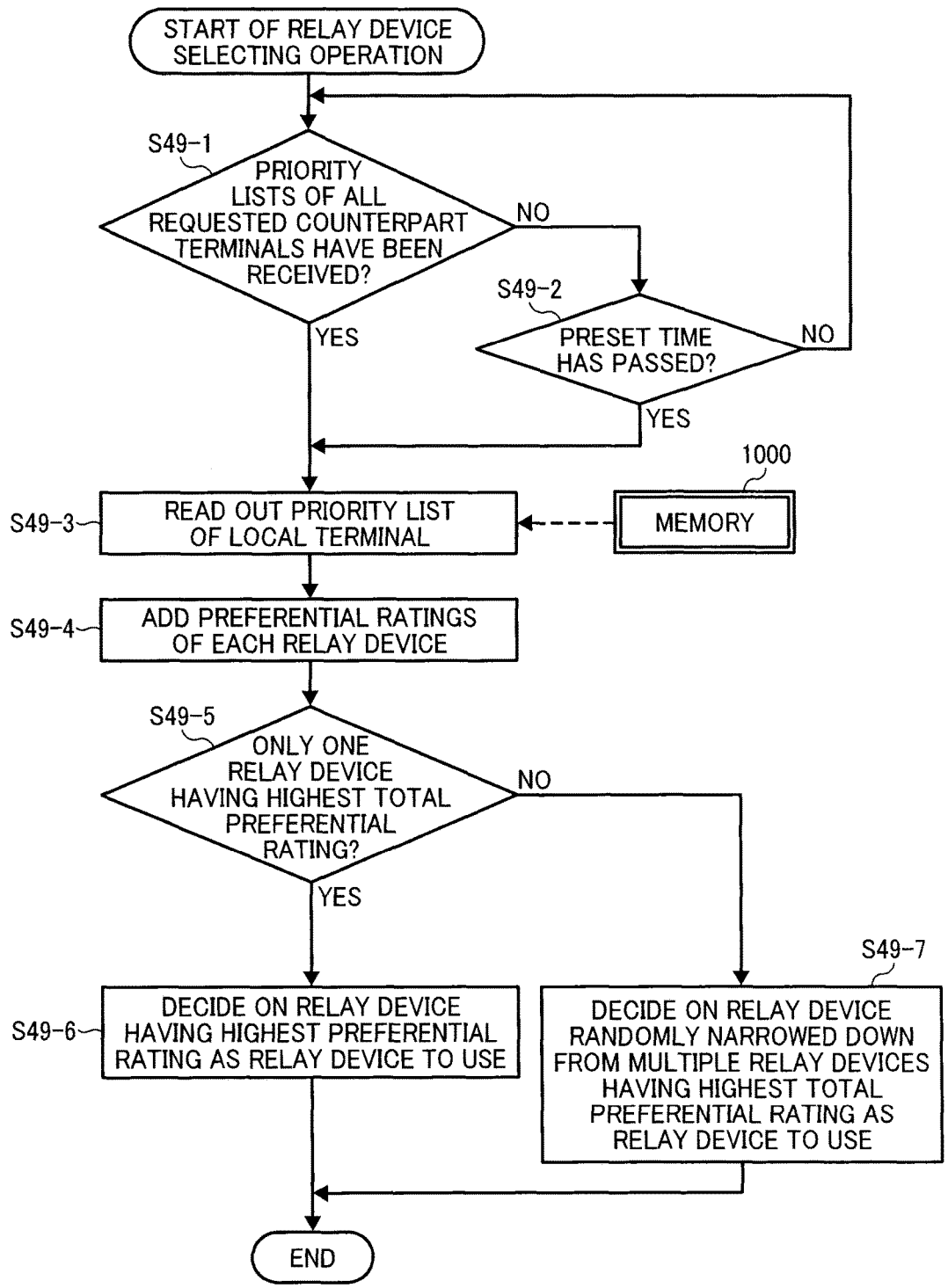
FIG. 18 is a flowchart illustrating operation of selecting a relay device by a transmission terminal.
Figure 19:
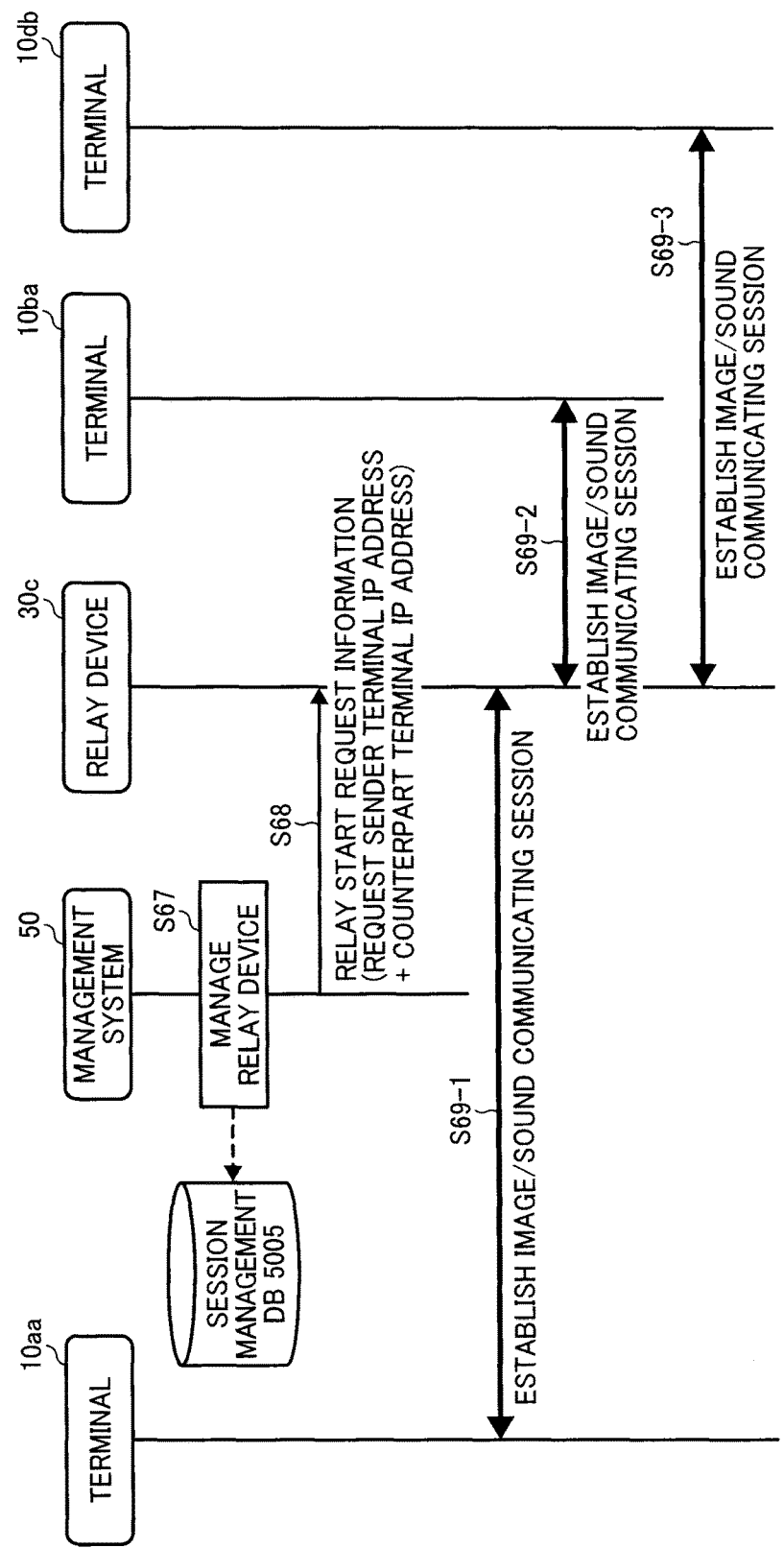
FIG. 19 is a sequence diagram illustrating operation of establishing a session for performing communication between transmission terminals.
Figure 20:
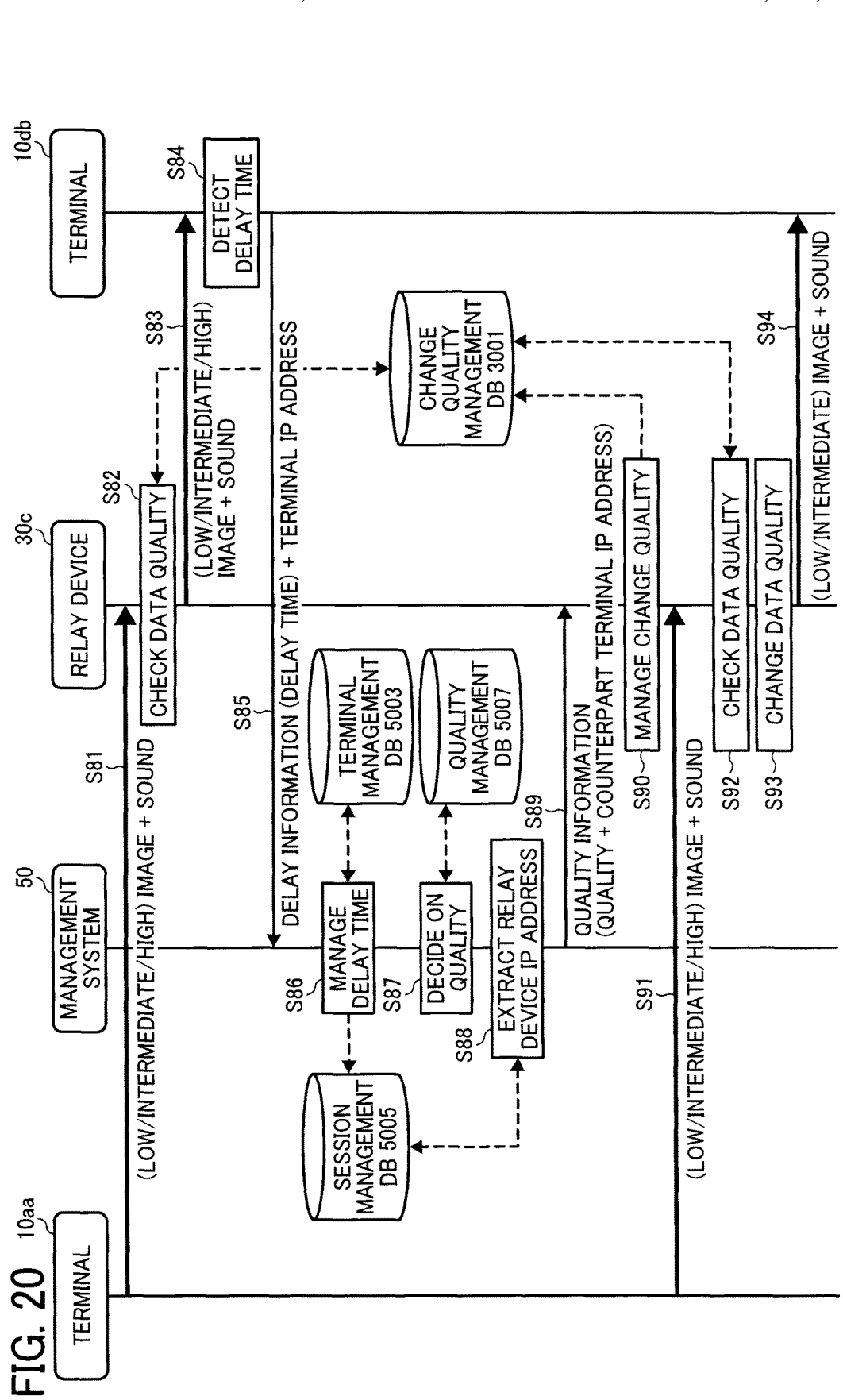
FIG. 20 is a sequence diagram illustrating operation of transmitting/receiving image data and sound data between transmission terminals.

Next, operation of the transmission system 1 according to the embodiment will be described using FIGS. 16 to 20. Note that FIG. 16 is a sequence diagram illustrating operation at a preparation step for starting communication between terminals. FIG. 17 is a sequence diagram illustrating operation of selecting a relay device. FIG. 18 is a flowchart illustrating operation of selecting a relay device by a transmission terminal. FIG. 19 is a sequence diagram illustrating operation of establishing a session for performing communication between transmission terminals. FIG. 20 is a sequence diagram illustrating operation of transmitting/receiving image data and sound data between terminals.

At first, an operation of transmitting/receiving each item of management information at a preparation step before starting communication between the terminal 10aa and the terminal 10db will be described using FIG. 16. Note that, in FIG. 16, various items of management information are entirely transmitted/received by the management information session sei illustrated in FIG. 2.

First, when the user turns on the power switch 109 illustrated in FIG. 5, the operation input acceptor 12 illustrated in FIG. 7 accepts the power on operation and turns on the power (step S21). In response to acceptance of the power on operation, the login requester 13 automatically transmits login request information indicating a login request received from the data transmitter/receiver 11 to the management system 50 via the communication network 2 (step S22). Note that the login request information may be transmitted in response to operation of the operation keys 108 by the user, instead of turning on of the power switch 109.

The login request information includes a terminal ID for identifying the terminal 10aa, which is a local terminal serving as a request sender, and a password. The terminal ID and the password are data that have been read via the data processor 19 from the memory 1000 and sent to the data transmitter/receiver 11. Note that, for the terminal ID and the password, data read out from an identification information storage medium such as a subscriber identity module (SIM) card connected to the terminal 10 may be used. In the case of transmitting login request information from the terminal 10aa to the management system 50, the management system 50, which is a receiving side, can detect the IP address of the terminal 10aa, which is a transmitting side.

Next, the terminal authenticator 52 of the management system 50 performs terminal authentication by searching the authentication management DB 5002 (see FIG. 11) of the memory 5000 by using the terminal ID and the password included in the login request information received via the data transmitter/receiver 51 as search keys, and determining whether the same terminal ID and the same password are managed in the authentication management DB 5002 (step S23). In the case where the terminal authenticator 52 determines that the login request is a login request received from a terminal 10 that has a legitimate use authority since the same terminal ID and the same password are managed, the state manager 53 stores, in the terminal management DB 5003 (see FIG. 12), the terminal ID of the terminal 10aa, the operating state, the date/time received at which the above-described login request information is received, and the IP address of the terminal 10aa in association with one another (step S24). Accordingly, the operating state "online", the date/time received "11. 10, 2009, 13:40", and the IP address "1.2.1.3" of the terminal 10aa are managed in association with the terminal ID "01aa" in the terminal management table illustrated in FIG. 12.

The data transmitter/receiver 51 of the management system 50 transmits authentication result information indicating an authentication result obtained by the terminal authenticator 52 to the request sender terminal (terminal 10aa) which has sent the above-mentioned login request, via the communication network 2 (step S25). In the embodiment, the case in which it has been determined by the terminal authenticator 52 that the terminal 10aa is a terminal that has a legitimate use authority will be described as follows.

The terminal extractor 54 of the management system 50 searches the candidate list management DB 5004 (see FIG. 13) by using the terminal ID "01aa" of the request sender terminal (terminal 10aa) which has sent the login request as a search key, and reads out and thereby extracts the terminal ID of a candidate counterpart terminal that can communicate with the request sender terminal (terminal 10aa) (step S26). Here, the terminal IDs ("01ab", "01ba", and "01db") of counterpart terminals (terminals 10ab, 10ba, and 10db) corresponding to the terminal ID "01aa" of the request sender terminal (terminal 10aa) are extracted.

Next, the terminal state obtainer 55 searches the terminal management DB 5003 (see FIG. 12) by using the terminal IDs ("01ab", "01ba", and "01db") of the counterpart terminals, which are extracted by the above-mentioned terminal extractor 54, as search keys, and reads corresponding operating states for the individual terminal IDs extracted by the above-mentioned terminal extractor 54, thereby obtaining the operating states of the terminals (10ab, 10ba, and 10db) (step S27).

Next, the data transmitter/receiver 51 transmits counterpart terminal state information including the terminal IDs ("01ab", "01ba", and "01db") serving as the search keys used in step S27 described above and the operating states ("offline", "online", and "online") of the counterpart terminals (terminals 10ab, 10ba, and 10db) corresponding to these terminal IDs to the request sender terminal (terminal 10aa) via the communication network 2 (step S28). In doing so, the request sender terminal (terminal 10aa) can obtain the current operating states of the terminals (10ab, 10ba, and 10db) that are candidates for a counterpart terminal that can communicate with the request sender terminal (terminal 10aa).

The terminal extractor 54 of the management system 50 further searches the candidate list management DB 5004 (see FIG. 13) by using the terminal ID "01aa" of the request sender terminal (terminal 10aa) which has sent the login request as a search key, thereby extracting the terminal ID of another request sender terminal that registers the terminal ID "01aa" of the above-mentioned request sender terminal (terminal 10aa) as a candidate for a counterpart terminal (step S29). In the candidate list management table illustrated in FIG. 13, the terminal IDs of other request sender terminals that are extracted are "01ab", "01ba", and "01db".

Next, the terminal state obtainer 55 of the management system 50 searches the terminal management DB 5003 (see FIG. 12) by using the terminal ID "01aa" of the request sender terminal (terminal 10aa) which has sent the login request as a search key, and obtains the operating state of the request sender terminal (terminal 10aa) which has sent the login request (step S30).

The data transmitter/receiver 51 transmits counterpart terminal state information including the terminal ID "01aa" and the operating state "online" of the request sender terminal (terminal 10aa), obtained in above-described step S30, to terminals (10ba and 10db) whose operating states are "online" in the terminal management DB 5003 (see FIG. 12), among the terminals (10ab, 10ba, and 10db) according to the terminal IDs ("01ab", "01ba", and "01db") extracted in above-described step S29 (steps S31-1 and S31-2). When transmitting the counterpart terminal state information to the terminals (10ba and 10db), the data transmitter/receiver 51 refers to the IP addresses of the terminals, which are managed in the terminal management table illustrated in FIG. 12, on the basis of the terminal IDs ("01ba" and "01db"). Accordingly, the terminal ID "01aa" and the operating state "online" of the request sender terminal (terminal 10*aa*) which has sent the login request can be transmitted to other counterpart terminals (terminals 10*db* and 10*ba*) that can communicate with the request sender terminal (terminal 10*aa*) which has sent the login request.

In contrast, in the other terminals 10, as in above-described step S21, when the user turns on the power switch 109 illustrated in FIG. 6, the operation input acceptor 12 illustrated in FIG. 7 accepts the power on operation and performs processing that is the same as or similar to above-described steps S22 to S31-1 and S31-2, descriptions of which are omitted.

Next, using FIG. 17, operation of selecting the relay devices 30 will be described. Note that, in FIG. 17, various items of management information are entirely transmitted/received by the management information session sei illustrated in FIG. 2. Here, the following description will discuss the case in which the user of a request sender terminal (terminal 10*aa*) selects to start communication with the users of counterpart terminals (terminal 10*ba* and terminal 10*db*).

First, when the user of a request sender terminal (terminal 10*aa*) presses the operation keys 108 illustrated in FIG. 5 and selects the terminal 10*ba* and the terminal 10*db*, the operation input acceptor 12 illustrated in FIG. 7 accepts a request for starting communication with the counterpart terminals (terminal 10*ba* and terminal 10*db*) (step S41). The data transmitter/receiver 11 of the request sender terminal (terminal 10*aa*) transmits to the management system 50 start request information indicating a request for starting communication (step S42). The start request information includes the terminal ID "01aa" of the request sender terminal (terminal 10*aa*), and the terminal IDs "01ba" and "01db" of the counterpart terminals (terminal 10*ba* and terminal 10*db*). Accordingly, the data transmitter/receiver 51 of the management system 50 can receive the above-mentioned start request information, and detect the IP address "1.2.1.3" of the request sender terminal (terminal 10*aa*), which is the transmission source.

On the basis of the terminal ID "01aa" of the request sender terminal (terminal 10*aa*), the terminal ID "01ba" of the counterpart terminal (terminal 10*ba*), and the terminal ID "01db" of the counterpart terminal (terminal 10*db*), which are included in the start request information, the state manager 53 changes the operating state field of each of records including the above-mentioned terminal IDs "01aa", "01ba", and "01db" to "communicating" in the terminal management table in the terminal management DB 5003 (see FIG. 12) (step S43). Note that, in this state, although the request sender terminal (terminal 10*aa*) and the counterpart terminals (terminal 10*ba* and terminal 10*db*) have not started communicating, if another terminal 10 tries to communicate with the request sender terminal (terminal 10*aa*) or either of the counterpart terminals (terminal 10*ba* and terminal 10*db*), a notification sound or display that indicates that the terminal is communicating is output.

Next, operation of executing a session for selecting a relay device 30 to be actually used will be described. First, the session manager 57 illustrated in FIG. 7 generates a selection session ID used in executing a session for selecting a relay device 30 (step S44). Here, the selection session ID "se1" is generated.

In the session management table (see FIG. 14) of the memory 5000, the session manager 57 stores the selection session ID "se1" generated in above-described step S44, the terminal ID "01aa" of the request sender terminal (terminal 10*aa*), and the terminal ID "01ba" of the counterpart terminal (terminal 10*ba*) in association with one another as a record on the first column, and stores the same selection session ID "se1" generated in above-described step S44, the terminal ID "01aa" of the request sender terminal (terminal 10*aa*), and the terminal ID "01db" of the counterpart terminal (terminal 10*db*) in association with one another as a record on the second column (step S45).

Next, the data transmitter/receiver 51 illustrated in FIG. 7 transmits start request information to the counterpart terminal (terminal 10*ba*) via the communication network 2 (step S46-1). The start request information includes the terminal ID "01aa" of the request sender terminal (terminal 10*aa*), received in above-described step S42, and the above-mentioned selection session ID "se1". Accordingly, the terminal 10*ba* can receive the IP address "1.1.1.2" of the management system 50, which is the transmission source of the start request information. Similarly, the data transmitter/receiver 51 illustrated in FIG. 7 transmits start request information to the counterpart terminal (terminal 10*db*) via the communication network 2 (step S46-2). The start request information includes the terminal ID "01aa" of the request sender terminal (terminal 10*aa*), received in above-described step S42, and the above-mentioned selection session ID "se1". Accordingly, the terminal 10*db* can receive the IP address "1.1.1.2" of the management system 50, which is the transmission source of the start request information.

In contrast, the data transmitter/receiver 11 of the counterpart terminal (terminal 10*ba*) transmits, in response to reception of the start request information in above-described step S46-1, reception completion information indicating reception completion, and a priority list of the local terminal (terminal 10*ba*) to the management system 50 (step S47-1). Accordingly, the data transmitter/receiver 51 of the management system 50 receives the reception completion information and the priority list. Note that the reception completion information includes the terminal ID "01aa" of the request sender terminal (terminal 10*aa*), received in above-described step S46-1, the terminal ID "01ba" of the counterpart terminal (terminal 10*ba*), which is the transmission source, and the selection session ID "se1". The data transmitter/receiver 51 of the management system 50 transmits the reception completion information and the priority list, received in above-mentioned step S47-1, to the request sender terminal (terminal 10*aa*) (S48-1). Accordingly, the request sender terminal (terminal 10*aa*) receives the reception completion information and the priority list.

Similarly, the data transmitter/receiver 11 of the counterpart terminal (terminal 10*db*) transmits, in response to reception of the start request information in above-described step S46-2, reception completion information indicating reception completion, and a priority list of the local terminal (terminal 10*db*) to the management system 50 (step S47-2). Accordingly, the data transmitter/receiver 51 of the management system 50 receives the reception completion information and the priority list. Note that the reception completion information includes the terminal ID "01aa" of the request sender terminal (terminal 10*aa*), received in above-described step S46-2, the terminal ID "01db" of the counterpart terminal (terminal 10*db*), which is the transmission source, and the selection session ID "se1". The data transmitter/receiver 51 of the management system 50 transmits the reception completion information and the priority list, received in above-mentioned step S47-2, to the request sender terminal (terminal 10*aa*) (step S48-2). Accordingly, the request sender terminal (terminal 10*aa*) receives the reception completion information and the priority list. Note that the reception completion information and the priority list need not be transmitted simultaneously, but may be transmitted separately.

Next, the request sender terminal (terminal 10aa) selects one relay device 30 to be actually used (step S49). Here, using FIGS. 18 and 19, operation of selecting, by the counterpart terminal (terminal 10db), the relay device 30 will be described. Note that, in FIG. 18, various items of management information are entirely transmitted/received by the management information session sei illustrated in FIG. 2.

First, the determiner 16b of the request sender terminal (terminal 10aa) determines, on the basis of the terminal IDs of the counterpart terminals, transmitted in above-described step S42, and the terminal IDs of the counterpart terminals, received in above-described steps S48-1 and S48-2, whether a priority list has been received from each counterpart terminal that has been requested by the request sender terminal to communicate, among all candidate counterpart terminals (step S49-1). In the case where priority lists have not been received from all the requested counterpart terminals (NO), the determiner 16b determines whether a preset time has passed (step S49-2). The preset time is, for example, 10 seconds after reception of the first priority list by the data transmitter/receiver 11. In the case where the preset time has not passed (NO), the operation returns to above-described step S49-1. In contrast, in the case where the processing in above-described step S49-1 determines that all priority lists have been received (YES), or the processing in above-described step S49-2 determines that the preset time has passed (YES), the operation proceeds to the processing in below-described step S49-3.

Next, the data processor 19 of the request sender terminal (terminal 10aa) reads out a priority list of the request sender terminal (terminal 10aa) from the memory 1000 (step S49-3). On the basis of the priority list (see FIG. 9A) of the request sender terminal (terminal 10aa), the priority list (see FIG. 9B) of the counterpart terminal (terminal 10ba), received in above-described step S48-1, and the priority list (see FIG. 9C) of the counterpart terminal (terminal 10db), received in above-described step S48-2, the calculator 16a of the request sender terminal (terminal 10aa) calculates the total preferential rating by adding the preferential ratings for each relay device ID (step S49-4).

Next, the determiner 16b determines whether there is only one relay device ID having the highest total preferential rating (step S49-5). In the example illustrated in FIGS. 9A to 9C, the total preferential rating of the relay device ID "111a" is "15"; the total preferential rating of the relay device ID "111b" is "21"; the total preferential rating of the relay device ID "111c" is "21"; and the total preferential rating of the relay device ID "111d" is "10". Therefore, the determiner 16b determines that there are two relay device IDs, namely, "111b" and "111c", that have the highest preferential rating.

Next, in the case where it is determined in above-described step S49-5 that there is only one relay device ID having the highest preferential rating (YES), the decider 16c decides on a relay device indicated by the relay device ID with the highest preferential rating as a relay device to be actually used (step S49-6).

In contrast, in the case where it is determined in above-described step S49-5 that there is more than one relay device ID having the highest preferential rating (NO), the decider 16c decides on a relay device indicated by a relay device ID that has been randomly (arbitrarily) narrowed down from a plurality of relay device IDs with the highest preferential rating as a relay device to be actually used (step S49-7).

Here, the following description will be given while assuming that the decider 16c decides on the relay device 30c indicated by the relay device ID "111c".

Referring back to FIG. 17, the data transmitter/receiver 11 of the request sender terminal (terminal 10aa) transmits selection information indicating that the relay device 30c has been selected to the management system 50 via the communication network 2 (step S50). The selection information includes the selection session ID "se1", and the relay device ID "111c" of the selected relay device 30c. Accordingly, the management system 50 can analyze, in execution of a session with the selection session ID "se1", that the relay device 30c has been selected, and receive the IP address of the request sender terminal (terminal 10aa), which is the transmission source of the selection information.

Next, as illustrated in FIG. 19, the session manager 57 of the management system 50 stores and manages the relay device ID "111c" of the relay device 30c, which has been consequently selected as one relay device, in a relay device ID field of a record including the selection session ID "se1" in the session management table (see FIG. 14) (step S67). In the example illustrated in FIG. 14, the relay device ID "111c" is stored and managed in relay device ID fields of records on the first column and the second column. The data transmitter/receiver 51 of the management system 50 transmits relay start request information indicating a request for starting relaying to the relay device 30c via the communication network 2 (step S68). The relay start request information includes the IP addresses of the request sender terminal (terminal 10aa) and the counterpart terminals (terminal 10ba and terminal 10db) to which data is relayed. Accordingly, the relay device 30c can analyze that the relay device 30c, which is the local device, has been selected. Thus, the relay device 30c establishes a session for communicating image data having three resolutions, namely, low resolution, intermediate resolution, and high resolution, and sound data between the terminals (10aa, 10ba, and 10db) (step S69-1, S69-2, and S69-3). Accordingly, the terminals (10aa, 10ba, and 10db) can start a videoconference.

Next, using FIGS. 7 and 20, in order to simplify the description, among the terminals (10aa, 10ba, and 10db), operation of transmitting/receiving image data and sound data in order to perform communication for a videoconference between the request sender terminal (terminal 10aa) and the counterpart terminal (terminal 10db) will be described.

First, the request sender terminal (terminal 10aa) transmits image data of a subject, captured by the image capturer 14, and sound data of a sound, input by the sound input 15a, from the data transmitter/receiver 11 to the relay device 30c via the communication network 2 using the image/sound data session sed illustrated in FIG. 2 (step S81). In the embodiment, high-quality image data having three resolutions, namely, low resolution, intermediate resolution, and high resolution, illustrated in FIGS. 3A to 3C, and sound data are transmitted. Accordingly, the data transmitter/receiver 31 of the relay device 30c receives the above-mentioned image data having three resolutions and sound data. The data quality checker 33 searches the change quality management table (see FIG. 10) by using the IP address "1.3.2.4" of the counterpart terminal (terminal 10db) as a search key, and extracts a corresponding image quality of image data to be relayed, thereby checking the image quality of image data to be relayed (step S82). In the embodiment, the checked image quality of image data is "high quality", which is the same quality as the image quality of the image data received by the data transmitter/receiver 31. Thus, the relay device 30c transfers the image data having the same image quality as it is, and the sound data having the same sound quality as it is, to the counterpart terminal (terminal 10db) using the image/sound data session sed (step S83). Accordingly, the data transmitter/receiver 11 of the counterpart terminal (terminal 10db) receives the high-quality image data having three resolutions, namely, low resolution, intermediate resolution, and high resolution, and the sound data. The display control 17 combines the image data having three image qualities and displays an image on the display 120, and the sound output 15b can output sound based on the sound data.

Next, the delay detector 18 of the terminal 10db detects a delay time in reception of image data received by the data transmitter/receiver 11 every preset time (such as every second) (step S84). The embodiment continues discussion of the following case where the delay time is 200 (ms).

The data transmitter/receiver 11 of the counterpart terminal (terminal 10db) transmits delay information indicating the delay time "200 (ms)" to the management system 50 via the communication network 2 using the management information session sei illustrated in FIG. 2 (step S85). Accordingly, the management system 50 can detect the delay time, and can detect the IP address "1.3.2.4" of the terminal 10db, which is the transmission source of the delay information.

Next, the delay time manager 60 of the management system 50 searches the terminal management table (see FIG. 12) by using the IP address "1.3.2.4" of the above-mentioned counterpart terminal (terminal 10db) as a search key, thereby extracting the corresponding terminal ID "01db", and further stores and manages the delay time "200 (ms)" indicated by the above-mentioned delay information in a delay time field of a record of the above-mentioned terminal ID "01db" in the session management table (see FIG. 14) (step S86).

Next, the quality decider 58 searches the quality management DB 5007 (see FIG. 15) by using the above-mentioned delay time "200 (ms)" as a search key, and extracts the corresponding image quality "intermediate quality" of image data, thereby deciding on the image quality as "intermediate quality" (step S87).

Next, the data transmitter/receiver 51 extracts, from the memory 5000, the IP address of the relay device ID "111c" associated with the above-mentioned terminal ID "01db" in the session management table (see FIG. 14) (step S88). Note that the IP address of each relay device ID is stored in advance in the memory 5000.

The data transmitter/receiver 51 transmits quality information indicating the image quality "intermediate quality" of image data, decided in above-described step S87, to the relay device 30c via the communication network 2 using the management information session sei illustrated in FIG. 2 (step S89). The quality information includes the IP address "1.3.2.4" of the counterpart terminal (terminal 10db), which is used as a search key in above-described step S86. Accordingly, the change quality manager 34 of the relay device 30c stores the IP address "1.3.2.4" of the terminal 10 (terminal 10db in this case) serving as a transmission destination and the image quality "intermediate quality" of image data to be relayed, in the change quality management table (see FIG. 10) (step S90).

Next, likewise in above-described step S81, the terminal 10aa transmits high-quality image data having three resolutions, namely, low resolution, intermediate resolution, and high resolution, and sound data to the relay device 30c using the image/sound data session sed (step S91). Accordingly, likewise in above-described step S82, the data quality checker 33 of the relay device 30c searches the change quality management table (see FIG. 10) by using the IP address "1.3.2.4" of the counterpart terminal (terminal 10db) as a search key, and extracts the corresponding image quality "intermediate quality" of image data to be relayed, thereby checking the image quality of image data to be relayed (step S92). In the embodiment, the checked image quality of image data is "intermediate quality", which is lower than the image quality "high quality" of the image data received by the data transmitter/receiver 31. Thus, the data quality changer 35 reduces the image quality of image data from "high quality" to "intermediate quality", and changes the quality of an image of image data (step S93).

The data transmitter/receiver 31 transmits the image data whose quality has been changed to "intermediate quality", and the sound data whose quality has not been changed, to the terminal 10db via the communication network 2 using the image/sound data session sed (step S94). Accordingly, the data transmitter/receiver 11 of the counterpart terminal (terminal 10db) receives the intermediate-quality image data having two resolutions, namely, low resolution and intermediate resolution, and the sound data. The display control 17 combines the image data having two image qualities and displays an image on the display 120, and the sound output 15b can output sound based on the sound data.

In this manner, in the case of a delay in reception at the counterpart terminal (terminal 10db) which receives image data, the relay device 30c changes the quality of an image, thereby not evoking a feeling of discomfort in people participating in the videoconference.

As has been described above, according to the embodiment, because a relay device is selected by taking into consideration not only a priority list of a request sender terminal, but also a priority list of a counterpart terminal, well-balanced transmission/reception of high-quality content data can be performed in communication between a plurality of transmission terminals.

Note that, in FIGS. 9A to 9C, the relay devices managed using the priority lists are all the same for the terminals 10aa, 10ba, and 10db, based on assumption that they are within the same system 1. However, the relay devices on the priority lists may not be the same for all of the terminals 10. In such case, as long as there are relay devices that are common to the terminals 10 that will be communicating, the relay device can be selected as described above using the priority list of each terminal 10.

The relay devices 30, the management system 50, the program providing system 90, and the maintenance system 100 in the above-described embodiment may be configured by a single computer or a plurality of computers to which divided units (functions) are arbitrarily allocated. In addition, in the case where the program providing system 90 is configured by a single computer, a program transmitted by the program providing system 90 may be separately transmitted in a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium such as a CD-ROM storing the terminal program, the relay device program, or the transmission management program in the above-described embodiment, the HD 204 storing these programs, and the program providing system 90 including the HD 204 are each used in the case where the terminal program, the relay device program, and the transmission management program are provided as program products to users within a certain country or outside that country.

Further, although management is performed using the change quality management table illustrated in FIG. 10 and the quality management table illustrated in FIG. 15 while paying attention to the resolution of an image of image data relayed by the relay device 30, which serves as an example of the quality of an image of image data, in the above-described embodiment, the embodiment is not limited to this case, and management may be performed while paying attention to other examples of the quality, such as the depth of the quality of image data, the sampling frequency of sound of sound data, or the bit length of sound of sound data. In addition, sound data may be transmitted/received separately in items of data having three types of resolutions (high resolution, intermediate resolution, and low resolution).

Although the date/time received is managed in FIGS. 12 and 14, the embodiment is not limited to this, and, out of the date/time received, it is only necessary to manage at least the time received.

Further, although the IP address of each relay device 30 is managed in the memory 5000 and the IP address of each terminal 10 is managed in the terminal management table (see FIG. 12) in the above-described embodiment, the embodiment is not limited to this case, and the fully qualified domain name (FQDN) of each relay device 30 or each terminal 10 may be managed instead as long as an FQDN serves as relay device identification information for identifying each relay device 30 on the communication network 2 or terminal identification information for identifying each terminal 10 on the communication network 2. In this case, an IP address corresponding to an FQDN is obtained by a Domain Name System (DNS) server of the related art. Note that, not only "relay device identification information for identifying each relay device 30 on the communication network 2", but also "relay device connection destination information indicating a connection destination of each relay device 30 on the communication network 2", or "relay device counterpart terminal information indicating a counterpart terminal of each relay device 30 on the communication network 2" may be used. Similarly, not only "terminal identification information for identifying each terminal 10 on the communication network 2", but also "terminal connection destination information indicating a connection destination of each terminal 10 on the communication network 2", or "terminal counterpart terminal information indicating a counterpart terminal of each terminal 10 on the communication network 2" may be used.

In addition, although the case of a videoconference terminal has been described as an example of a transmission terminal in the above-described embodiment, the embodiment is not limited to this case, and the communication system 1 may be a phone system such as an IP phone system or an Internet phone system. In addition, a smart phone, a mobile phone, a car navigation terminal, a wearable computer, a monitoring camera, an electronic blackboard, a projector, a game machine, or industrial equipment with a communication function may be used. A wearable computer includes a watch and a head-mounted display. Industrial equipment includes office equipment such as a multifunction peripheral (MFP) printer product, medical equipment such as an endoscope, and agricultural equipment such as a cultivator.

In addition, although image data and sound data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, sound data, touch data, and smell data.

In addition, although the case in which a videoconference is held by the transmission system 1 has been described in the above-described embodiment, the embodiment is not limited to this case. The transmission system 1 may be used in meetings, general conversation between family members or friends, or one-way presentation of information.

Although terminal IDs are used in the above-described embodiment, user IDs for identifying users may be used instead.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A transmission terminal of a plurality of transmission terminals in a communication system that includes a management server that manages communication between the transmission terminals, the transmission terminal comprising:
   a memory that stores first preferential rating information indicating a predetermined preference of the transmission terminal in using each of a plurality of relay devices, wherein the first preferential rating information associates, for each one of the plurality of relay devices, relay device identification information identifying the relay device and a preferential rating of the transmission terminal in using the relay device;
   a transmitter that transmits, to the management server, a start request for starting communication with a counterpart transmission terminal;
   a receiver that receives, from the management server, second preferential rating information indicating a predetermined preference of the counterpart transmission terminal in using each of the plurality of relay devices, the second preferential rating information being transmitted from the counterpart transmission terminal in response to the start request, wherein the second preferential rating information associates, for each one of the plurality of relay devices, relay device identification information identifying the relay device and a preferential rating of the counterpart transmission terminal in using the relay device; and
   circuitry configured to select one relay device to relay content data between the transmission terminal and the counterpart transmission terminal, from the plurality of relay devices, using the first preferential rating information and the second preferential rating information, wherein the circuitry is further configured to
   add, for each of the relay devices identified by a same relay device identification information, the preferential rating of the relay device indicated by the first preferential rating information and the preferential rating of the relay device indicated by the second preferential rating information, to derive a total preferential rating in using the relay device, and
   select at least one relay device having a highest value of the total preferential rating, as the relay device to relay content data.

2. The transmission terminal of claim 1,
   wherein the circuitry is further configured to determine whether there is more than one relay device having the highest value of the total preferential rating, and
   when the circuitry determines that there is more than one relay device having the highest value of the total preferential rating, the circuitry is configured to arbitrarily select one of the relay devices having the highest value of the total preferential rating, as the relay device to relay content data.

3. The transmission terminal of claim 1, wherein
   the transmitter further transmits selection information indicating the selected relay device to the management system to request for starting relaying of content data between the transmission terminal and the counterpart terminal via the selected relay device.

4. The transmission terminal of claim 1, wherein the counterpart transmission terminal includes one or more transmission terminals.

5. The transmission terminal of claim 1, wherein the transmission terminal includes at least one of a videoconference terminal, smart phone, portable phone, car navigation system, wearable computer, and game machine.

6. A method of selecting, by a transmission terminal of a plurality of transmission terminals in a communication system that includes a management server that manages communication between the transmission terminals, one of a plurality of relay devices, comprising:
   storing, in a memory of the transmission terminal, first preferential rating information indicating a predetermined preference of the transmission terminal in using each of the plurality of relay devices, wherein the first preferential rating information associates, for each one of the plurality of relay devices, relay device identification information identifying the relay device and a preferential rating of the transmission terminal in using the relay device;
   transmitting, to the management server, a start request for starting communication with a counterpart transmission terminal;
   receiving, from the management server, second preferential rating information indicating a predetermined preference of the counterpart transmission terminal in using each of the plurality of relay devices, the second preferential rating information being transmitted from the counterpart transmission terminal in response to the start request, wherein the second preferential rating information associates, for each one of the plurality of relay devices, relay device identification information identifying the relay device and a preferential rating of the counterpart transmission terminal in using the relay device;
   selecting, by circuitry of the transmission terminal, one relay device to relay content data between the transmission terminal and the counterpart transmission terminal, from the plurality of relay devices, using the first preferential rating information and the second preferential rating information;
   adding, for each of the relay devices identified by a same relay device identification information, the preferential rating of the relay device indicated by the first preferential rating information and the preferential rating of the relay device indicated by the second preferential rating information, to derive a total preferential rating in using the relay device; and
   selecting at least one relay device having a highest value of the total preferential rating, as the relay device to relay content data.

7. The method of claim 6, further comprising:
   determining whether there is more than one relay device having the highest value of the total preferential rating,
   wherein, when the determining determines that there is more than one relay device having the highest value of the total preferential rating, the selecting arbitrarily selects one of the relay devices having the highest value of the total preferential rating, as the relay device to relay content data.

8. A non-transitory computer-readable medium including instructions which, when executed by circuitry of a transmission terminal of a plurality of transmission terminals in a communication system that includes a management server that manages communication between the transmission terminals, cause the circuitry to perform a method of selecting one of a plurality of relay devices, the method comprising:
   storing, in a memory of the transmission terminal, first preferential rating information indicating a predetermined preference of the transmission terminal in using each of the plurality of relay devices, wherein the first preferential rating information associates, for each one of the plurality of relay devices, relay device identification information identifying the relay device and a preferential rating of the transmission terminal in using the relay device;

transmitting, to the management server, a start request for starting communication with a counterpart transmission terminal;

receiving, from the management server, second preferential rating information indicating a predetermined preference of the counterpart transmission terminal in using each of the plurality of relay devices, the second preferential rating information being transmitted from the counterpart transmission terminal in response to the start request, wherein the second preferential rating information associates, for each one of the plurality of relay devices, relay device identification information identifying the relay device and a preferential rating of the counterpart transmission terminal in using the relay device;

selecting, by the circuitry, one relay device to relay content data between the transmission terminal and the counterpart transmission terminal, from the plurality of relay devices, using the first preferential rating information and the second preferential rating information;

adding, for each of the relay devices identified by a same relay device identification information, the preferential rating of the relay device indicated by the first preferential rating information and the preferential rating of the relay device indicated by the second preferential rating information, to derive a total preferential rating in using the relay device; and selecting at least one relay device having a highest value of the total preferential rating, as the relay device to relay content data.

9. The computer-readable medium of claim 8, the method further comprising:

determining whether there is more than one relay device having the highest value of the total preferential rating, wherein, when the determining determines that there is more than one relay device having the highest value of the total preferential rating, the selecting arbitrarily selects one of the relay devices having the highest value of the total preferential rating, as the relay device to relay content data.

10. The transmission terminal of claim 1, wherein the first and second preferential rating information comprise a relay device identifier and a value of a preferential rating for each relay device, the value being settable by a user of the transmission terminal or an administrator of the management server.

11. The method of claim 6, wherein the first and second preferential rating information comprise a relay device identifier and a value of a preferential rating for each relay device, the value being settable by a user of the transmission terminal or an administrator of the management server.

12. The non-transitory computer-readable medium of claim 8, wherein the first and second preferential rating information comprise a relay device identifier and a value of a preferential rating for each relay device, the value being settable by a user of the transmission terminal or an administrator of the management server.

13. The transmission of claim 1, wherein the first and second preferential rating information is set based on at least one of an operational cost of each relay device, a reliability of each relay device, and a capability of each relay device.

* * * * *